(12) United States Patent
Huss et al.

(10) Patent No.: US 11,808,046 B2
(45) Date of Patent: *Nov. 7, 2023

(54) MODULAR PLATFORM SYSTEM AND METHOD OF ASSEMBLY

(71) Applicant: Wearwell, LLC, Smyrna, TN (US)

(72) Inventors: Philip C. Huss, Smyrna, TN (US); John Moughler, Smyrna, TN (US)

(73) Assignee: Wearwell, LLC, Smyrna, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/870,906

(22) Filed: Jul. 22, 2022

(65) Prior Publication Data

US 2022/0356718 A1    Nov. 10, 2022

Related U.S. Application Data

(63) Continuation of application No. 17/011,169, filed on Sep. 3, 2020, now Pat. No. 11,428,015.

(51) Int. Cl.
| | |
|---|---|
| *E04F 15/024* | (2006.01) |
| *A47B 13/00* | (2006.01) |
| *A63J 1/00* | (2006.01) |
| *B62B 3/00* | (2006.01) |
| *B62B 9/20* | (2006.01) |
| *E04B 1/343* | (2006.01) |
| *E04B 5/02* | (2006.01) |
| *E04F 19/02* | (2006.01) |

(52) U.S. Cl.
CPC ...... *E04F 15/02458* (2013.01); *A47B 13/003* (2013.01); *A63J 1/00* (2013.01); *B62B 3/008* (2013.01); *B62B 9/20* (2013.01); *E04B 1/34315* (2013.01); *E04B 1/34336* (2013.01); *E04B 5/023* (2013.01); *E04F 15/02405* (2013.01); *E04F 19/02* (2013.01); *B62B 2301/044* (2013.01)

(58) Field of Classification Search
None
See application file for complete search history.

(56) References Cited

U.S. PATENT DOCUMENTS

| | | | |
|---|---|---|---|
| 2,956,653 A | 10/1960 | Liskey, Jr. | |
| 3,180,460 A | 4/1965 | Liskey, Jr. | |
| 3,348,459 A * | 10/1967 | Harvey | E01C 9/083 404/35 |
| 3,557,670 A * | 1/1971 | Sutton | E01C 9/083 244/114 R |
| 3,696,578 A | 10/1972 | Swensen et al. | |

(Continued)

FOREIGN PATENT DOCUMENTS

| | | |
|---|---|---|
| EP | 0 004 521 | 10/1979 |
| EP | 1 662 068 | 8/2009 |

(Continued)

*Primary Examiner* — Joshua K Ihezie
(74) *Attorney, Agent, or Firm* — Clark & Brody LP

(57) ABSTRACT

A modular platform system includes a plurality of tiles, legs, beams, and brackets. Peripheries of the tiles and top surfaces of the beams are configured so that the tiles can snap on to the beams, allowing for easy creation of a platform. The beams, legs, and brackets are all configured so that the beams and legs are easily connected together for platform system creation.

25 Claims, 24 Drawing Sheets

(56) References Cited

U.S. PATENT DOCUMENTS

| | | | | |
|---|---|---|---|---|
| 3,870,333 A * | 3/1975 | Burdick | | E06C 1/397 182/132 |
| 4,073,113 A * | 2/1978 | Oudot | | E04B 2/766 403/189 |
| 4,168,922 A * | 9/1979 | Worrallo | | F16B 12/44 403/231 |
| 4,561,232 A | 12/1985 | Gladden, Jr. et al. | | |
| 4,598,510 A | 7/1986 | Wagner, III | | |
| 4,630,417 A * | 12/1986 | Collier | | E04F 15/02452 174/487 |
| 4,656,795 A * | 4/1987 | Albrecht | | E04F 15/02435 52/800.1 |
| 4,676,036 A * | 6/1987 | Bessert | | E04F 15/02435 52/126.6 |
| 4,807,317 A * | 2/1989 | Quinn | | E04F 11/181 404/43 |
| 4,825,603 A | 5/1989 | Hardwicke et al. | | |
| 4,825,976 A | 5/1989 | Wyse | | |
| 4,876,834 A * | 10/1989 | Domigan | | H02G 3/263 248/188.4 |
| 4,901,490 A | 2/1990 | Zinniel et al. | | |
| 4,922,670 A * | 5/1990 | Naka | | E04F 15/02458 52/126.6 |
| 5,074,085 A | 12/1991 | Ueda | | |
| 5,118,233 A * | 6/1992 | Mitchell | | F16B 37/045 411/85 |
| 5,152,371 A * | 10/1992 | Wyse | | E04G 1/12 182/119 |
| 5,363,613 A * | 11/1994 | Sevier | | A47B 47/025 108/130 |
| 5,465,534 A * | 11/1995 | Mittag | | E04F 15/02458 D25/138 |
| 5,477,649 A * | 12/1995 | Bessert | | H02G 3/285 52/126.2 |
| 5,848,501 A * | 12/1998 | Taipale | | E04F 11/002 52/126.6 |
| 6,189,289 B1 | 2/2001 | Quaglia et al. | | |
| 6,256,952 B1 | 7/2001 | Fahy, Jr. et al. | | |
| 6,481,177 B1 * | 11/2002 | Wood | | F16B 7/187 403/231 |
| 6,694,689 B1 * | 2/2004 | Scott | | H02G 3/385 52/460 |
| 6,745,524 B1 * | 6/2004 | Weinberg | | E04F 15/02452 52/220.1 |
| 6,877,828 B2 * | 4/2005 | Strong | | A47B 81/002 280/47.35 |
| 7,246,779 B2 * | 7/2007 | Doyle | | A47B 9/10 248/188.8 |
| 7,360,343 B1 | 4/2008 | Spransy et al. | | |
| 7,373,759 B1 * | 5/2008 | Simmons | | E04F 15/024 52/126.2 |
| 7,509,782 B2 * | 3/2009 | Colosimo | | E04F 19/08 52/126.6 |
| 8,434,275 B2 | 5/2013 | Hashimoto et al. | | |
| 8,695,140 B1 * | 4/2014 | Zyadet | | E01C 11/222 14/69.5 |
| 8,888,397 B2 * | 11/2014 | Oetlinger | | F16B 7/18 403/199 |
| 9,004,715 B1 * | 4/2015 | Litke | | A47F 3/001 362/218 |
| 9,016,625 B2 * | 4/2015 | Lu | | B64C 1/18 52/588.1 |
| 9,212,483 B2 | 12/2015 | Permesang | | |
| 9,273,464 B2 * | 3/2016 | Roen | | E04B 9/18 |
| 10,538,923 B2 * | 1/2020 | Marchetti | | E04F 15/105 |
| 10,570,626 B1 * | 2/2020 | Kim | | E04F 15/02464 |
| 10,648,186 B2 * | 5/2020 | Bailie | | E04G 7/24 |
| 2002/0037195 A1 | 3/2002 | Ajiki | | |
| 2003/0205875 A1 * | 11/2003 | Ondrasik | | B60B 33/0073 280/33.991 |
| 2005/0005547 A1 * | 1/2005 | Mead | | E04F 15/02452 52/263 |
| 2006/0016637 A1 | 1/2006 | Irvin | | |
| 2007/0175132 A1 | 8/2007 | Spransy et al. | | |
| 2010/0205874 A1 * | 8/2010 | Zlatar | | E04B 5/43 52/126.6 |
| 2011/0052357 A1 * | 3/2011 | Torrison | | B62B 3/008 280/5.2 |
| 2013/0047529 A1 | 2/2013 | Foden | | |
| 2017/0321436 A1 * | 11/2017 | Dammer | | E04F 15/02005 |
| 2017/0370100 A1 * | 12/2017 | Ben-Zeev | | E04C 2/543 |

FOREIGN PATENT DOCUMENTS

| | | |
|---|---|---|
| EP | 3 119 279 | 3/2018 |
| JP | 11-264231 | 9/1999 |
| KR | 10-1023526 | 3/2011 |
| KR | 2011-0080449 | 7/2011 |
| WO | 02/077396 | 10/2002 |

* cited by examiner

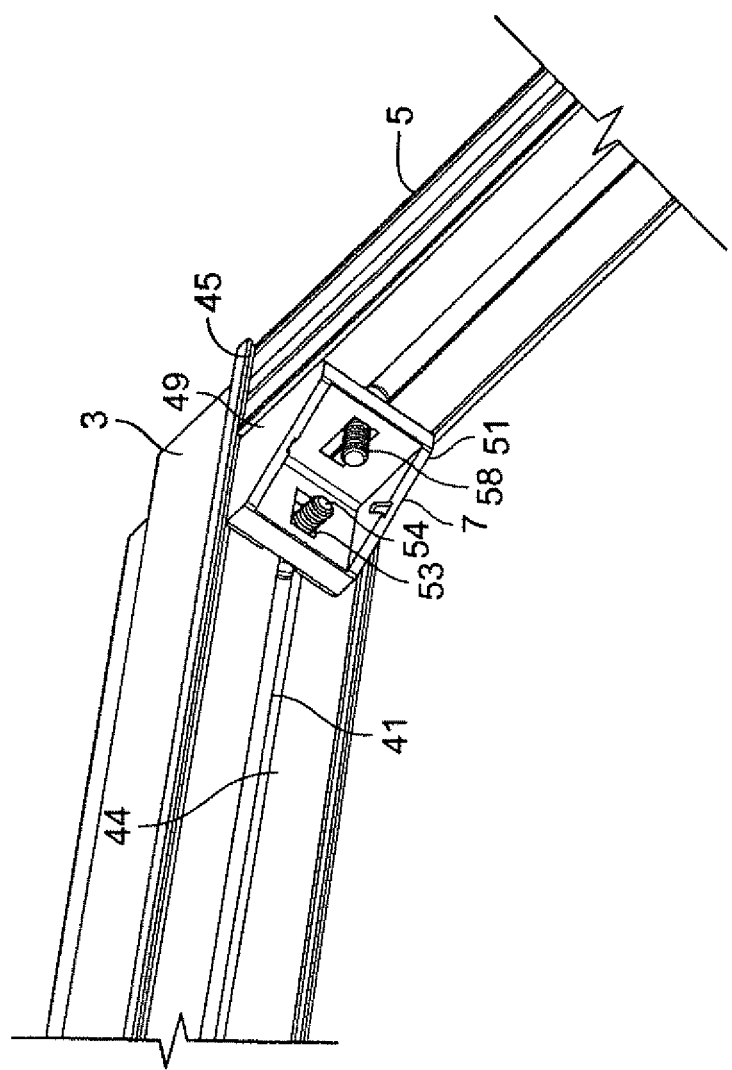

MODULAR PLATFORM SYSTEM AND METHOD OF ASSEMBLY

FIELD OF THE INVENTION

A modular platform system includes tiles, beams, legs, and brackets, each configured to allow creation of differently-configured platforms in a simple fashion.

BACKGROUND OF THE INVENTION

Platform systems are known in the art. U.S. Pat. No. 4,676,036 to Bessert, U.S. Pat. No. 6,256,952 to Fahy et al., U.S. Pat. No. 4,901,490 to Zinniel, U.S. Pat. No. 4,561,232 to Gladden, Sr. et al., U.S. Pat. No. 7,360,343 to Spransy et al, and U.S. Pat. Nos. 2,956,653 and 3,180,460 to Liskey Jr. are examples of such systems. However, these platform systems lack flexibility and ease in the ability to make differently-configured platforms using the same components. In general, these prior art systems are time consuming and inconvenient to create a desired platform, expensive, inflexible in accommodating different configurations, and are ad-hoc or special purpose in their design. As such, there is a need for improved platform systems. The present invention provides an improvement in platform systems in the combination and specially-configured and modular components that permit the creation of differently configured platform systems using the same components.

SUMMARY OF THE INVENTION

One object of the invention is to provide an improved modular platform system.

Another object of the invention is to provide a platform system that allows a multitude of designs for the platform system, including in terms of defining a desired amount of platform surface space, a platform that can have different elevations within the platform, a platform system that can have different tiles or mixed kinds of tiles depending on the location of the platform and its intended use, and a platform system that can easily incorporate railings, ramps, toe boards, and/or trays positioned beneath tiles.

The invention also includes a method of assembling the modular platform system using the various components of the system itself.

In satisfactions of the objects and advantages, the present invention provides, in one embodiment of a modular platform system, a modular platform system having a plurality of tiles, each tile having a slot positioned along a peripheral edge of the tile and along an underside of the tile. The tile also has an underside surface aligned with the slot, the slot formed by a member extending downwardly from an upper portion of the tile.

The system also includes a plurality of beams, each beam having a pair of upright members extending from a top surface of the beam. The pair of members are spaced apart to create a channel, the channel configured to receive the member of the tile. The top surface of the beam also has a portion extending outwardly from each upright member, the portion designed to engage the underside surface of a tile for support thereof. Each beam also includes a slot extending along a bottom surface of the beam. The member of the tile is configured so that it clips or snaps onto one of the upright members to better secure the tile to the beam.

A plurality of legs are also provided with the platform system. Each leg has side surfaces, each side surface including a slot extending longitudinally along the leg.

The system also includes a plurality of brackets, each bracket having a pair of attaching surfaces. The attaching surfaces form a 90 degree angle, with each attaching surface having an opening to allow a fastener to attach the attaching surface to a beam using the slot of the beam or a leg using the slot in the leg.

With the members of the tiles engaged to the beams, the legs attached to the beams at different locations on the beams, and the brackets securing at least the legs to the beams, an elevated platform system is created with the plurality of tiles forming a platform surface.

The underside surface of each beam can have a pair of spaced apart flanges, the flanges engaging a portion of the leg to prevent turning thereof when the leg is in contact with the beam.

The modular platform system can also include one or more railings, a portion of the railing configured to attach to one of the beams or the legs of the platform system.

The modular platform system can also include one or more ramps, each ramp having a lip configured to engage the channel between the upright members of the beam, similar to the attachment of the tiles to the beams.

Another feature of the modular platform system is a plurality of cross beams. Each cross beam has opposing ends, each opposing end configured to attach to a side face of the leg member to provide additional stability to legs of the platform system.

While the legs can be cut to different lengths to allow for different elevations of the tiles for a given platform system, a plurality of leg assemblies can be used in place of the set length legs. These leg assemblies are each adjustable in height in a sliding fashion using two leg sections of the assembly to allow tiles of the modular platform system to be set at different elevations.

Yet another feature of the modular platform system is the use of one or more toe boards. The toe boards are configured to attach to a leg or a beam, each toe board sized to have a portion thereof extend above the platform surface to act as a stop to prevent items from rolling off the platform surface.

The tiles can have virtually any surface configuration, including open tiles, smooth or closed tiles, and tiles with slip resistant top surfaces, where the top surface could have a plurality of raised portions or a roughed surface to provide improve traction and less slipping. One or different kinds of tiles can be used for any one platform system.

When using the open tiles, trays can be employed to catch items or fluid falling through the open tiles. Each tray is configured to be supported by adjacent beams and be positioned beneath one or more open tiles to catch any material falling through the open tiles.

The modular platform system can also be assembled with two or more different elevations so that each platform system would have two different tile sections of different heights. In the mode for a two level platform, the plurality of legs can be made by cutting longer leg sections to two different heights so as to create the two level system using the combination of longer and shorter legs to create a two level platform. The shorter legs can also be used to create a lower elevation platform that can be used as a platform step.

Each leg can also be configured to have a lip along each longitudinal edge of the leg. Opposing lips for each face of the leg then form a channel to receive a portion of the bracket and prevent rotation of the bracket when attached to a leg.

While the legs, beams, brackets, and cross beams of the platform system can be made of any materials, the use of a high strength aluminum alloy is preferred to provide both high strength and low weight for modular platform system. For elongated components such as the beams, cross beams, and legs, these components can be made as extrusions.

While the platform system can be height arranged for walking or standing, the height can be adjusted to provide a table surface for use to support items or the like that need easy hand access. The platform system can also be made movable by the use of casters. When using casters, the platform system can be assembled with a low profile using the tiles, beams, brackets, horizontal legs, casters, and a push handle so that the platform system can function as a cart.

The invention also includes a method for creating any number of differently-designed platform systems. In this method, the plurality of tiles, legs, beams, and brackets are first provided. In a preferred mode, the tiles are attached to the beams, and then the legs are attached to the beams to create the platform system. The other components, e.g., cross beams, toe boards, railings, ramps, and trays can be added dependent on the desired configuration for a given platform system. Of course, different orders of component attachment can be employed to create a desired platform.

BRIEF DESCRIPTION OF THE DRAWINGS

FIG. 3b shows an underside view of the tile of FIG. 3a.

FIG. 3c shows an enlarged view of a peripheral portion of the tile of FIG. 3a.

FIG. 7a shows a perspective view of an exemplary connection between a bracket and beam of the platform system of FIG. 1.

DETAILED DESCRIPTION OF THE INVENTION

The inventive modular platform system provides a number of advantages over other known platform systems. In contrast to many prior art systems, the inventive modular platform system has a "snap together" feature that allows for easy installation of tiles. The system is light in weight but very strong. The nature of the components makes the platform easy to maintain. The platform is highly versatile as different heights can be employed in the same system.

With the snap on feature of the tiles, different kinds of tiles can be provided with the system and, depending on a change of conditions, one type of tile can be replaced with another types. The tiles can also be made of post-consumer recycled material and are low cost while still maintaining a high load rating, e.g., 400 pounds. Since the tiles have the snap-on feature on the entire periphery of the tile, different direction runs of the beams used in the platform system, e.g., beams running both parallel and perpendicular, can be easily accommodated when attaching the tiles.

The beams of the system can be made as extruded aluminum alloy beams, which provide a high strength. The beam configuration also allows for flexibility in attachment to the legs used in the platform system and other beams.

The use of the brackets and special configuration of the beams and legs allows for a customizable height feature for the platform and the use of simple nut and carriage bolt fasteners for platform assembly. The legs can also accept rubber feet if desired and permit the use of a cross beam between legs to add further stability to the platform.

With the snap on feature of the tiles to the beams, a clean look from the top of the platform is provided as no connectors or fasteners are visible.

With the adjustable height feature of the platform, different platform heights can be used in a given system or one set of tiles can be used as a step to another level of tiles in the platform system. The different platform heights can also accommodate different kinds of tiles. For a given platform system, one section may require open tiles whereas another section may need closed tiles. The tile arrangements are easily made and changed with the snap-on feature created by the configuration of both the tile periphery and beam top portion.

Figure 1:
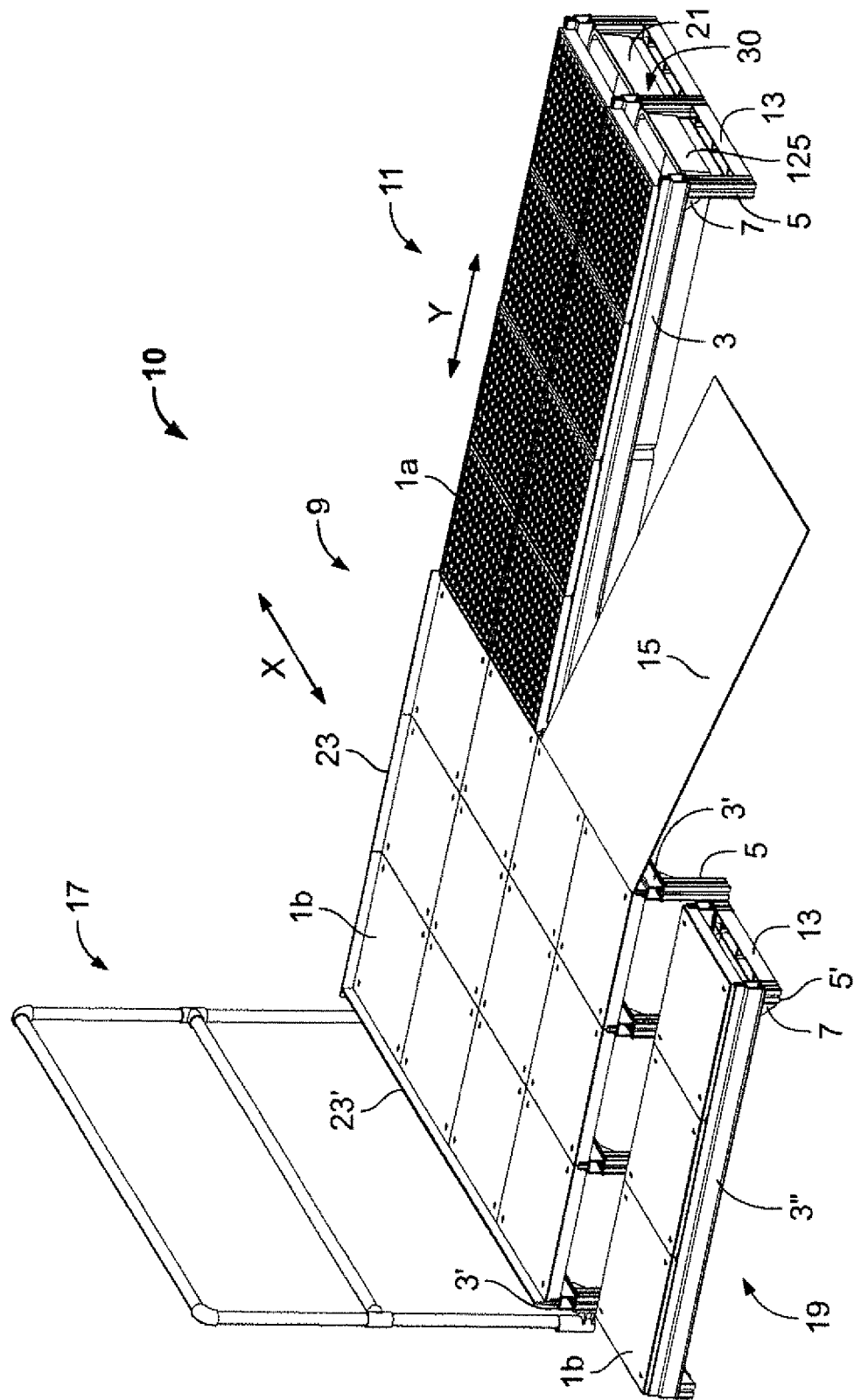
FIG. 1 shows a perspective view of one configuration of a platform using the inventive modular platform system.

FIG. 1 shows a perspective view of one arrangement of the modular components of the modular platform system. The modular platform system (hereinafter the platform system) is designated by the reference numeral 10. The platform system has a number of components that are used to assemble a completed platform system, some essential components to create a functional platform and some optional components used if the platform application requires such optional components.

The platform system 10 includes a plurality of tiles 1a and 1b and beams 3, 3'. The tiles 1a are open tiles and the tiles 1b are closed and smooth surfaced tiles. The tiles are designed to clip or snap onto the portions of the beams 3 for easy assembly and disassembly of the platform system. The beams 3, 3' are supported by legs 5. The beams 3, 3' and legs 5 are configured so that the legs 5 can be easily attached to the beams 3, 3'.

The platform system 10 also includes brackets 7. The brackets 7 are configured to attach the legs 5 to the beams 3. The brackets 7 can also be used to secure a leg 5 to a ground surface if further securement of the platform system is required.

The beams 3 can be arranged to run in different directions for a given platform system. In FIG. 1, the platform system has one section 9, which uses four beams 3' and twelve tiles, with the beams 3 of section 9 running along direction "X". Another section of tiles 11 uses three beams 3 and eight tiles. The beams 3 in tile section 11 run along direction "Y", which is perpendicular to the direction "X" for beams 3' in tile section 9. The two sets of beams 3, 3' can be attached in one way using the brackets 7 as described in more detail below.

In alternative and not shown in FIG. 1, the legs of each tile section 9 and 11 could be attached to the floor so that there would be no need for a connection between support beams of adjacent tile sections 9 and 11. The tile sections 9 and 11 would stand alone from each other but still be located next to each other to provide a continuous upper surface for the platform system. By using just the legs to support different platform sections of a platform system, the beams could run in different angled directions that just 90 degrees as shown in FIG. 1. One set of beams could be angled at 30 or 45 degrees, for example, to another set of beams.

The platform system 10 can also include cross beams 13. The cross beams 13 and legs 5 are configured so that one cross beam 13 can attach between adjacent legs 5. More particularly, the free end of tile section 11 has three legs 5 and two cross beams 13, each cross beam 13 arranged between adjacent legs 5. With the placement of the cross beams 13, the legs 5 are further stabilized against movement and shifting when the weight or other forces are applied to the platform. Preferably, the cross beams are made of the same material as the beams and legs. However, since the cross beams do not see the loads that the beams and legs see, other materials for the cross beams can be employed, e.g., non-metallics like polymers.

The platform system can also include a ramp 15, the ramp designed to attach to a beam 3, preferably in a similar manner as the attachment between the beams 3, 3' and tiles 1a and 1b. The ramp allows for platform system use by a user that cannot handle walking up or down steps and/or allows items to be rolled up to the platform upper surface or down therefrom. The ramp can be made of any material that would provide the strength to support a worker traveling up or down the ramp and any items that may be rolled up or down the ramp. A metal ramp is preferred as this would provide the desired strength but high strength polymers, composites, and the like could also be used.

Another feature of the platform system is the use of hand railing 17. The hand railing can be configured to attach to the platform in any manner, and preferably to one or more legs, beams or other platform system components. The handrail 17 can be positioned with respect to the tile section 9 of tiles forming a floor of the platform system. While the railing 17 is shown associated with tile section 9, it can be associated with other sections of tiles or multiple railings could be used depending on the location of the platform assembly and need to the presence of a railing for safety purposes.

The legs 5 can be made of the same material as the beams 3, 3' and also provided in a standard length, e.g., six feet. With this standard length, the legs can then be cut to length to provide a given platform system with tiles at different elevations. A six foot length of leg could provide six 1 foot sections for platform use, for example. Of course, the legs 5 could be supplied in lengths specified by a customer for a particular platform system as well.

An example of the one type of adjustable height feature of the legs is shown in the platform system 10 of FIG. 1. In this system, a number of tiles 1b, beams 3", smaller height legs 5', cross beams 13, and brackets 7 are employed to create a step designated by the reference numeral 19. It can be seen that the beams 3, 3' for tile sections 9 and 11 are one length (the equivalent of four tiles in length) and the beams 3" that form the step 19 shorter in length (three tiles in length). The construction of the step 19 illustrates the flexibility of the platform system as the same beams and legs that are used for each tile section 9 and 11 can be used to create step 19; just that the beams and legs are cut and reduced in length to form the step 19. This length flexibility in both the legs and beams allows a wide variety of elevations for a platform system or within a platform system and a wide variety of the arrangement of the tiles for a given platform system.

Typically, the beams 3 would be made in six foot lengths as shown in tile sections 9 and 11 and this six foot length would accommodate four tiles that are 18 inches square. For the step 19, the legs are shortened in length as are the beams 3, with the beams being roughly 54 inches to accommodate a run of three 18 inch on side tiles 1b.

Yet another feature of the platform system is the use of trays 21, which are used in the tile section 11 of the platform system 10. The trays 21 are positioned beneath the open tiles 1a to collect any debris or other items that may fall onto the open tiles and pass therethrough. The trays 21 and beams 3 are also configured to allow the trays 21 to slide along a surface of the beams 3 to be positioned beneath the tiles 1a. The trays 21 could be sized to match the size of a give tile or be longer in length. In FIG. 1, a set of two trays (four trays in total) are shown beneath each of the longitudinally or Y-direction-aligned four tile sets of tile section 11. The trays can be made of any material, metal or non-metallic, but a preferable construction would be non-metallic, e.g., a polymer that could be easily molded into the tray shape and be inexpensive and light weight.

Another feature of the platform system is the use of toe boards, which are designed as a barrier along the peripheral edge of the platform to prevent items from rolling off the platform surface. One configuration of toe boards is shown in FIG. 1 as 23 and the other as 23' for closed tile section 9. The toe boards 23 and 23' are configured to abut an outer edge of a run of tiles and extend above the tile surfaces to prevent items that may be on the tile surface or dropped thereon from rolling off the platform. In one mode, the toe board 23 can attach to the beams 3. In other mode, the toe boards could be secured to the platform using the legs 7. The modes of attachment are only exemplary and other modes of attachment could be used as long as the attachment positions a portion of the toe board above the tile surfaces. The toe boards could be made of any material, either metallic or non-metallic. As with the trays, a preferred material would be a durable polymer that would have sufficient strength to take impact from workers or other items on the platform surface that may come into contact with the toe board. An example of this material would be a high density polyethylene.

Figure 2A:
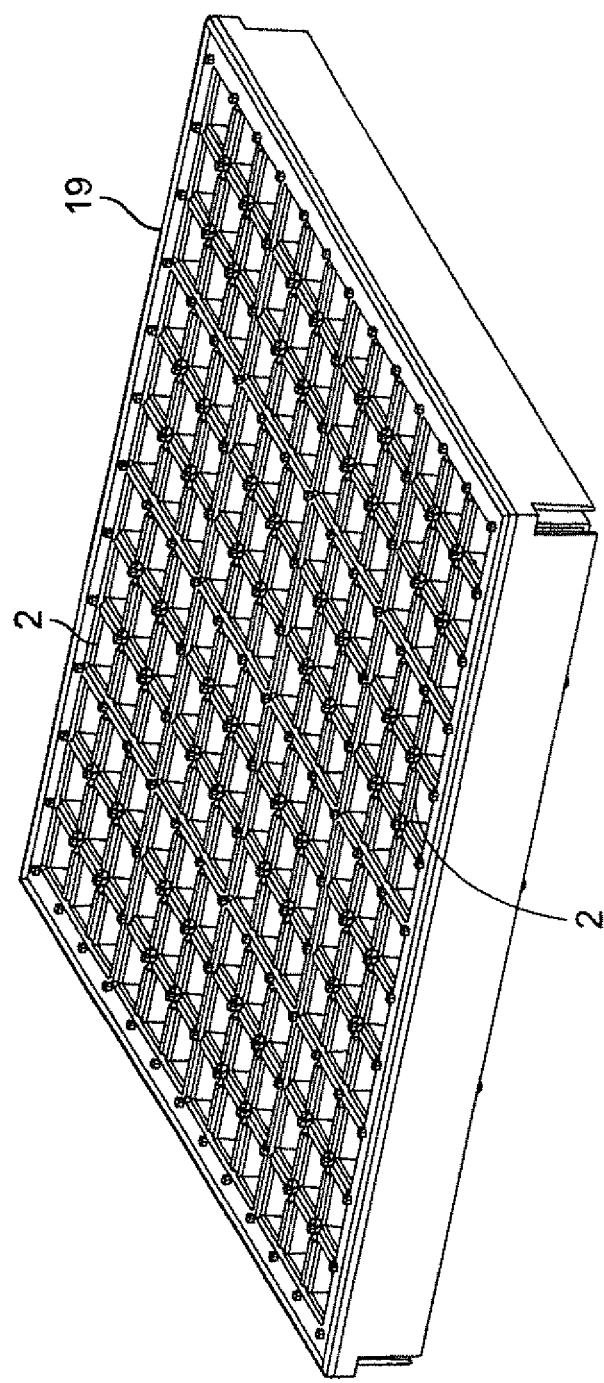
FIGS. 2A-2C shows three different examples of the types of tiles that can be used in the modular platform system.
Figure 2B:
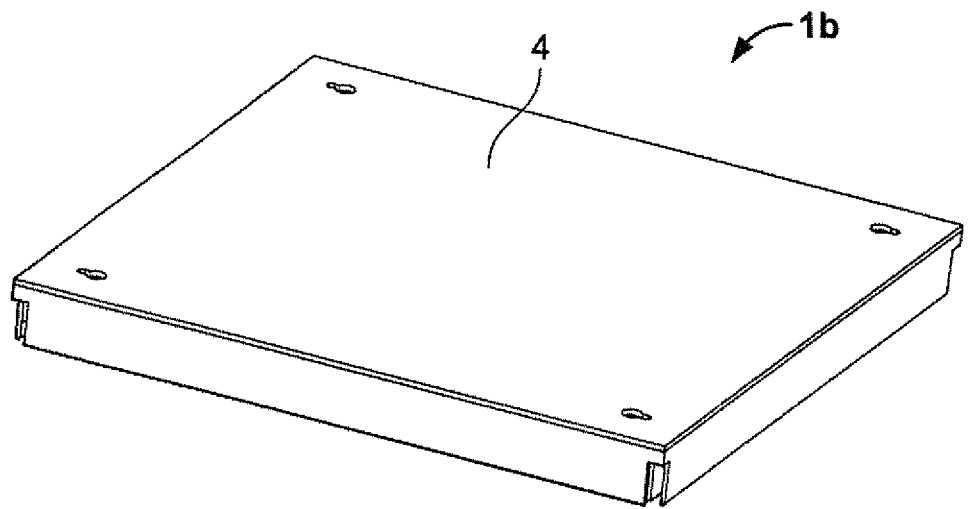
Figure 2C:
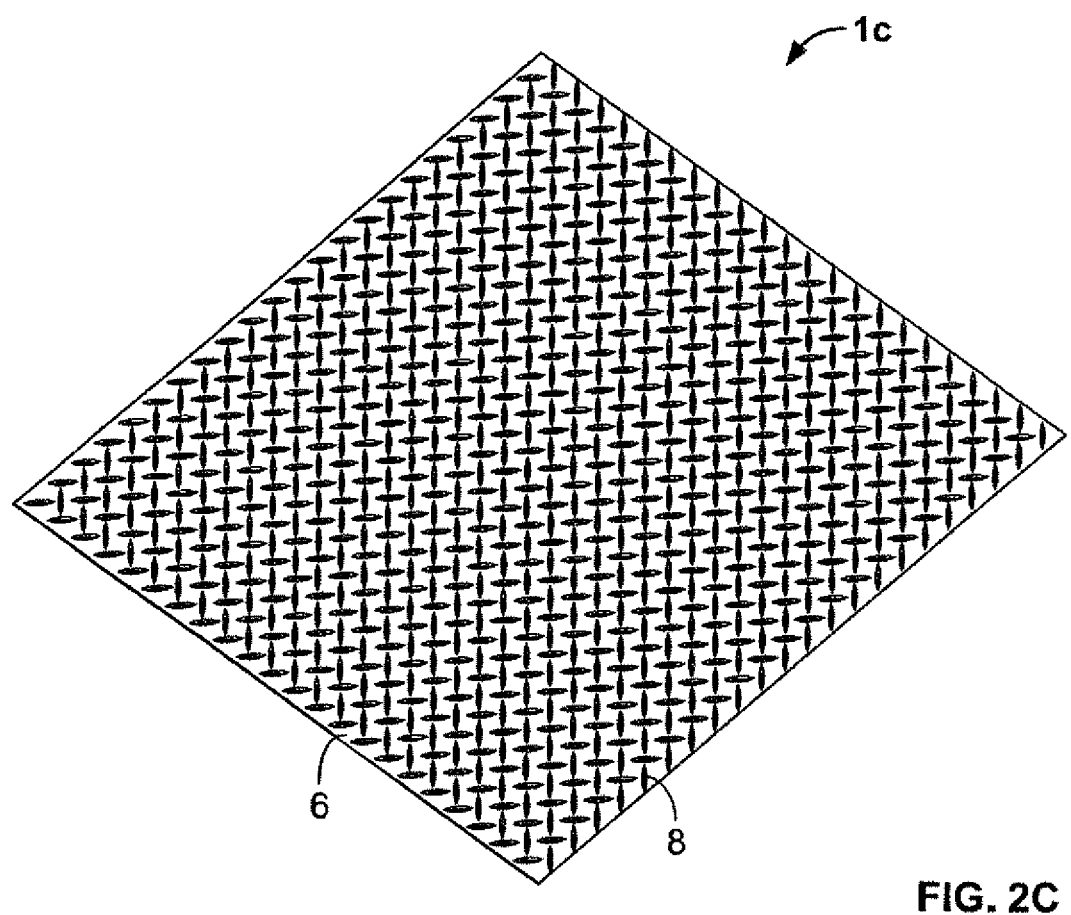

As noted above, the platform system 10 includes two different tiles, each of which are shown in FIGS. 2a and 2b. FIG. 2a illustrates tile 1a, which is a tile, with a number of openings 2 therein. The open tile design shown is only an example of the types of openings employed and other opening designs could also be used for the tile 1a. FIG. 2b shows a closed surface tile design 1b with a closed surface 4. FIG. 2c shows yet another tile 1c, which combines a closed surface 6 with raised portions 8 for slip resistance. While the raised portions with shown in a diamond pattern, any kind of configuration for the raised portions could be used for the tile 1c. Alternatively, the surface 6 could be a rough surface as well for slip resistance.

Figure 3A:
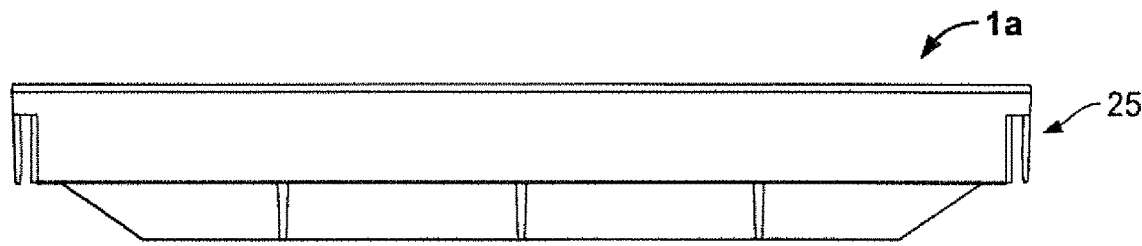
FIG. 3a shows a side view of one tile of the platform system.
Figure 3B:
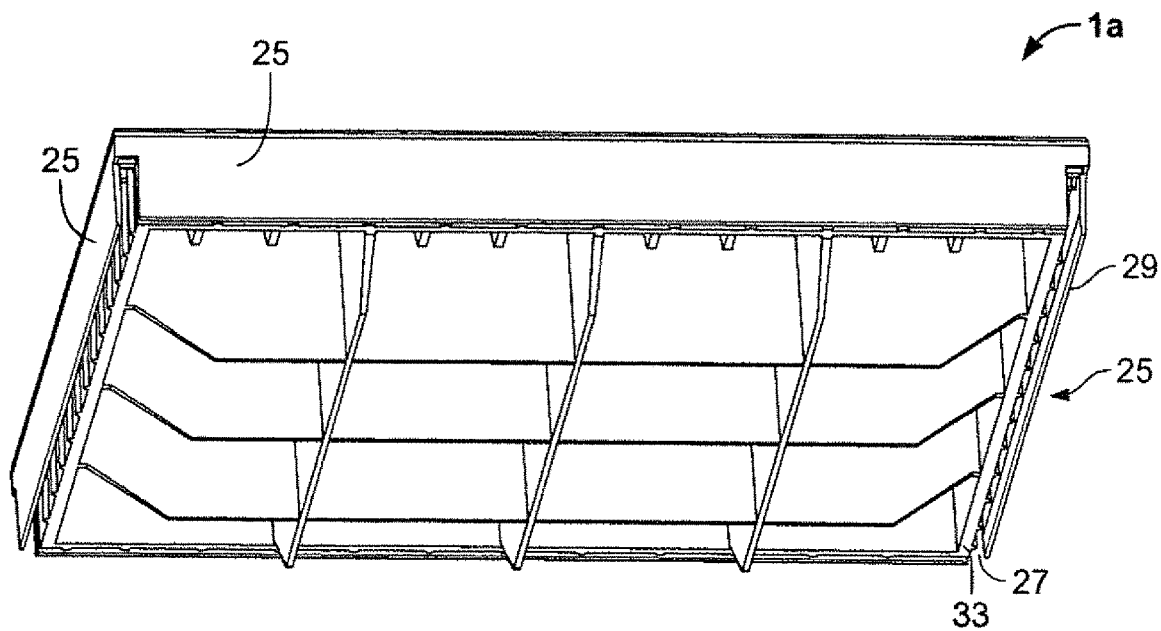
Figure 3C:
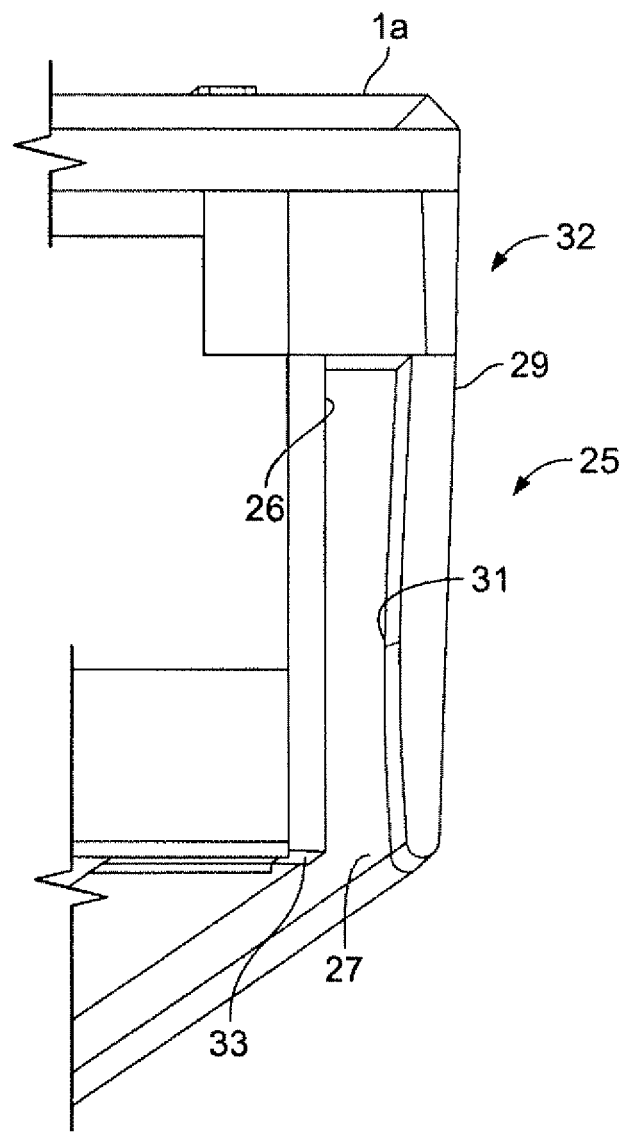

FIG. 3a-3c show more details regarding one of the tiles used in the platform system of FIG. 1 and the capability to snap fit to a beam for platform assembly. FIG. 3a shows a side view of a tile 1a with the tile periphery identified by the reference numeral 25. FIG. 3b shows an underside view of the tile 1a and FIG. 3c shows an enlarged view of a portion of the tile and its tile periphery 25. The tile periphery 25, that is, all four sides of a given tile, has a slot 27 along each side. The slot is formed by a side face 26 of the tile member 29 and a member 29 that extends from an upper portion 32 of the tile 1a. The member 29 has an enlarged portion 31, which creates a bias against an adjacent surface fitted into the slot 27 so that a clipping or snap on action is obtained when the tile 1a is attached to a beam 3. The tile 1a also includes an underside surface 33 that also engages a surface of the beam 3 for tile support.

Figure 4A:
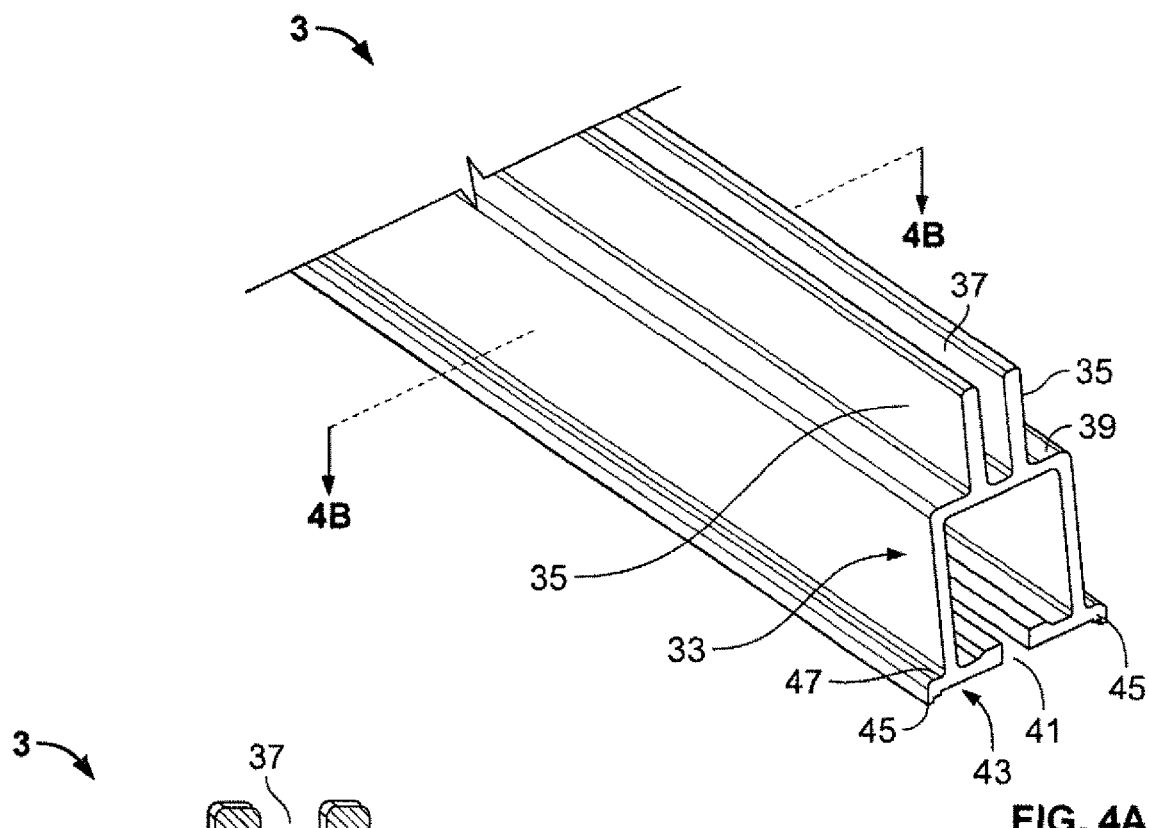
FIG. 4a shows a perspective view of a beam for use in the platform system.
Figure 4B:
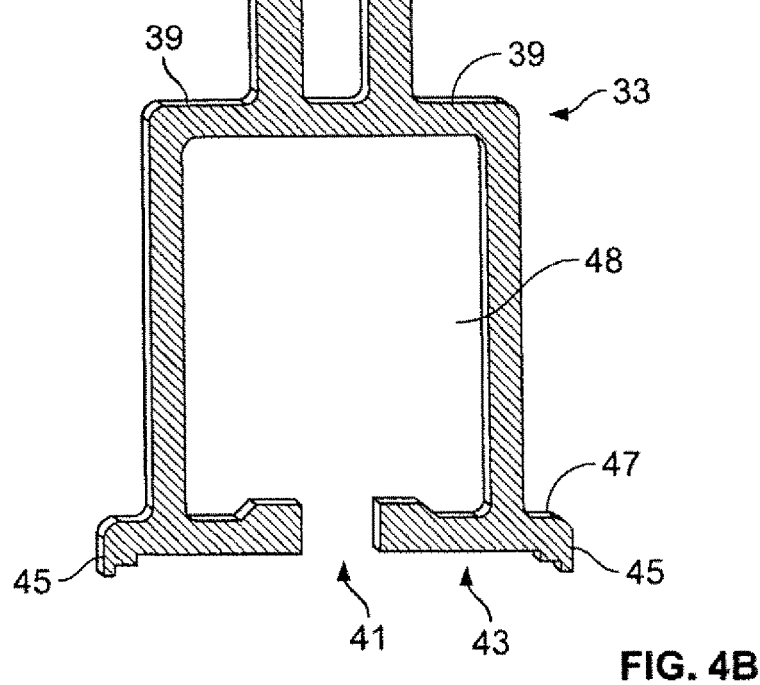
FIG. 4b shows a cross sectional view along the line 4B-4B of FIG. 4.

The beam 3 has an elongate shape and a profiled cross section that provides a number of different functionalities for the assembly and stability of the platform system. FIG. 4a shows a portion of the beam 3 in perspective view and FIG. 4b shows a sectional view of the beam 3. Preferably, the beam 3 is one that is extruded from an aluminum alloy for ease of making the desired profile. Using aluminum as the material of the beam allows for the use of a high strength aluminum alloy such as from one from the 6000 series alloys.

An upper portion 33 of the beam 3 includes a pair of upright members 35. The upright members 35 form a channel 37. Laterally outside of the upright members 35 and channel 37 are a pair of supporting surfaces 39. The upright members 35 and channel 37 interface with the periphery 25 of the tile 1a to allow the tile 1a to easily snap into place on the arrangement of beams for any given platform system as is detailed below.

Figure 5:
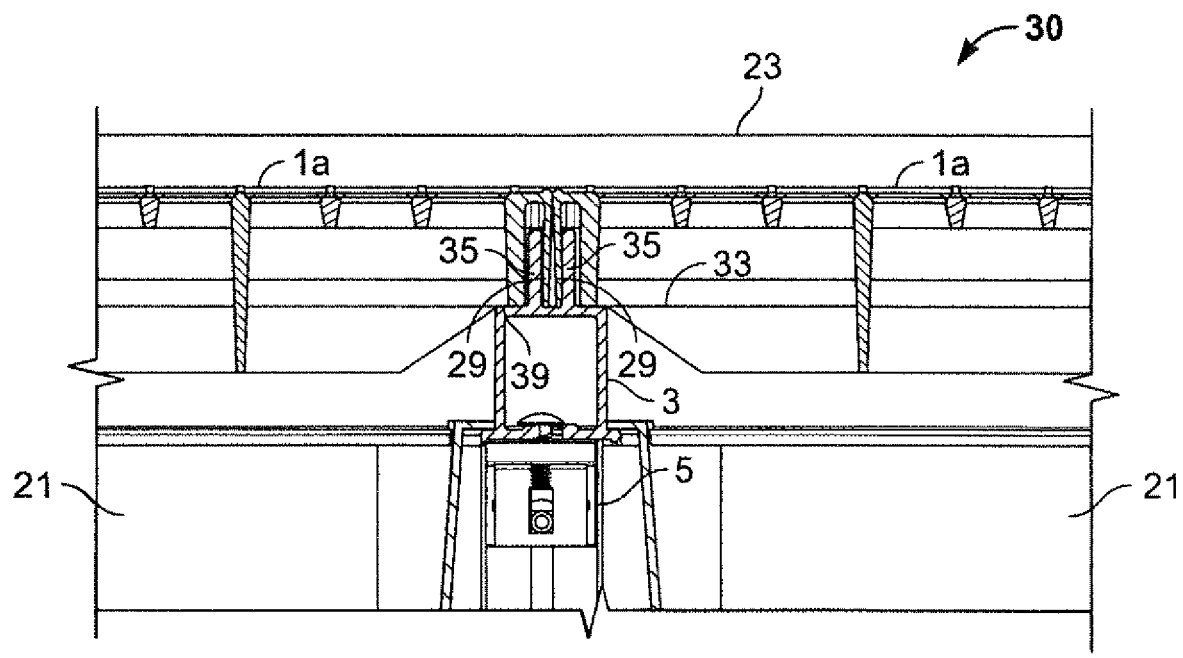
FIG. 5 shows a front view of the connection of two tiles and a beam from the platform system shown in FIG. 1.

One example of a connection arrangement between a beam and tiles is illustrated in FIG. 5. The location of this particular arrangement is designated by the reference numeral 30 in FIG. 1, which is a front view of the free end of the tile section 11. In the tile and beam connection, each member 29 of each tile 1a engages the channel 37 formed between the two upright members 35 of the beam 3. At the same time, each upright member 35 engages the slot 27 in each tile periphery 25. Because of the shape of the members 29 and enlarged portion 31 thereof, the members 29 snap in or clip to the beam 3 to provide a tight connection between tile and beam. That is, the member 29 is biased against an inside surface of the channel 37 between the upright members 35 of the beam 3. Since the connection is primarily made using the clip action described above, the tiles are also easily removed from the beams by lifting the tile with enough force to disengage the upright members 35 of the beam 3 from a slot 27 in the tile periphery 25.

The beam 3 is also configured to facilitate connection to the legs 5 using the brackets 7. Referring back to FIGS. 4a and 4b, the beam has a slot 41 that runs along a bottom portion 43 of the beam 3. The bottom portion also has a bottom surface 44, a pair of spaced apart flanges 45, and supporting surfaces 47. The hollow nature of the beam 3 also creates a space 48. These features are used in connection with the bracket 7 and leg 5 to link or attach a leg 5 to a beam 3.

Figure 6:
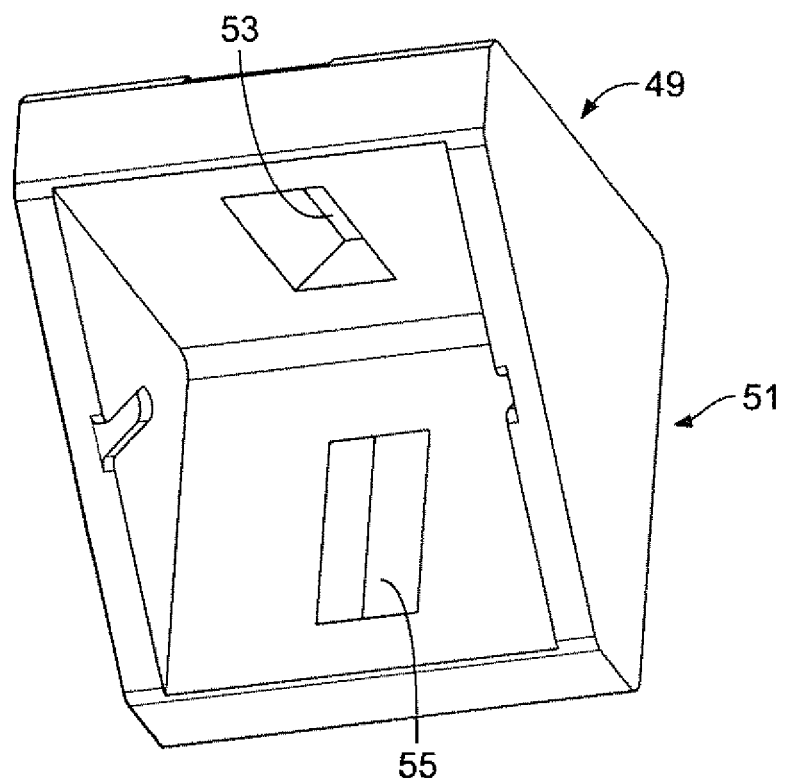
FIG. 6 shows a perspective view of a bracket used in the platform system of FIG. 1.

FIG. 6 shows a perspective view of the bracket 7. The bracket 7 is angled in shape and has two portions 49 and 51, disposed from each other at 90 degrees. Each of the portions 49 and 51 includes respective openings 53 and 55 extending therethrough to accommodate a fastener for attaching to either a beam 3, a leg 5, or a ground surface/floor that the platform system rests upon.

FIG. 7a shows one of a beam 3, a bracket 7, and a leg 5 from the platform system of FIG. 1 in an exemplary connection between a bracket 7, beam 3, and leg 5. The description for the connection between just the beam 3 and bracket 7 is now described. First, a carriage bolt is positioned with its head located in the space 48 of the beam 3 so that the threaded portion 54 of the carriage bolt extends through the slot 41 in the beam 3. The bracket 7 is then positioned so that the threaded portion 54 of the carriage bolt can extend through the opening 53 in the upper portion 49 of the bracket 7. The carriage bolt can be secured with a nut (not shown). Use of the carriage bolt and nut allows the one portion 49 of the bracket 7 to be secured to the underside surface 44 of the beam 3 via tightening of the nut against the bracket 7.

Figure 7B:
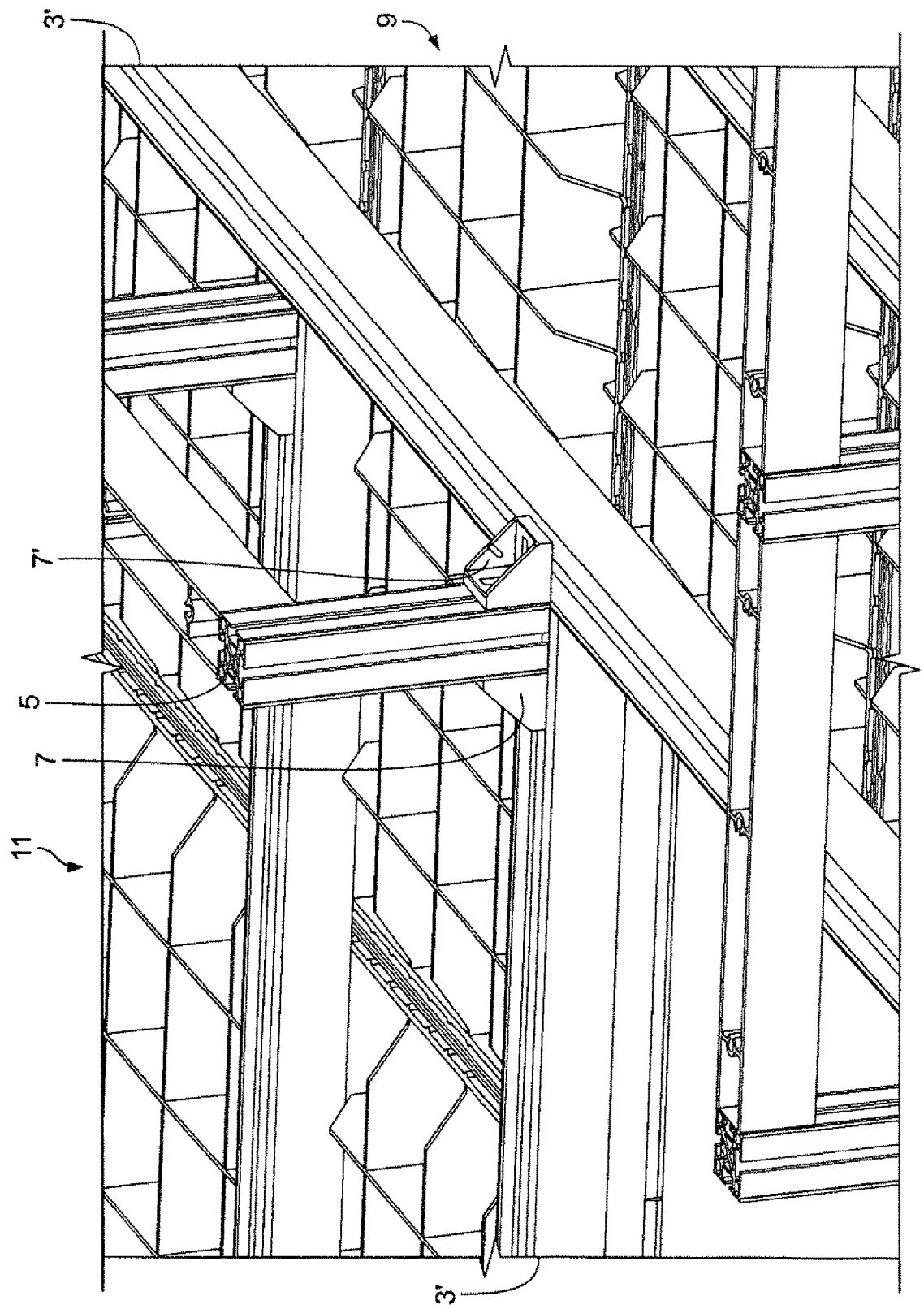
FIG. 7b shows a perspective view of an alternative connection between differently-aligned beams using brackets.
Figure 8:
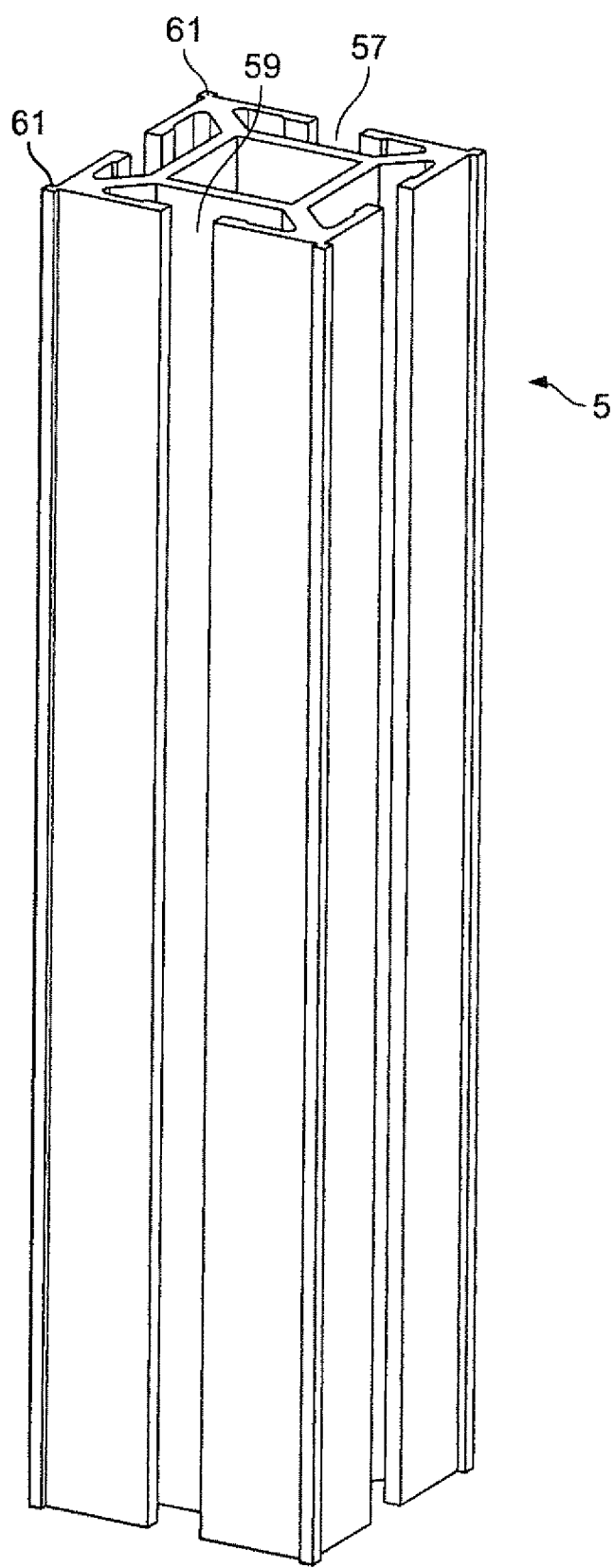
FIG. 8 shows a perspective view of a leg of the platform system of FIG. 1.

With reference to FIGS. 7a and 8, the bracket 7 also attaches to the leg 5 when creating the platform system 10. The leg 5 is shown in FIG. 8 in an exemplary length, which can be used as is or cut to a shorter length. In this embodiment, the leg 5 is generally square in cross section and has a slot 57 in each side thereof. The slot 57 forms a space 59 to slide a carriage bolt head into space 59 and have the threaded portion 58 of the bolt extending through the slot 57 for attachment to the other portion 51 of the bracket 7. The leg 5 also has a lip 61 on each longitudinal corner. The leg width is sized so that a portion of the bracket 7 fits between the lips 61 on any one face of the leg 5. This fit prevents the bracket 7 from rotating when the bracket 7 is attached to the leg 5, as edges of the bracket are restrained from rotation by the lips 61. Each four faces of the leg 5 have the same configuration, i.e., include the slot and the space. With this symmetry, opposite or adjacent faces of a leg can be used with a bracket for support of two or more beams. The beams could be orthogonal to each other with one end of a beam abutting a side face of another beam and the opposing faces could be used for bracket connection. In another mode, ends of beams could meet to form a 90 degree angle and adjacent faces of the legs could be used to secure the beams to the legs with brackets.

Referring back to FIG. 7a, the flanges 45 of the beam 3 interface with two sides of the leg 5. That is and with reference to FIG. 4b, the top of the leg 5 engages the undersurface 44 of the beam 3. At the same time, the top of the leg 5 sits between the two flanges 45 such that the leg rotation is prevented as the flanges 45 act as a stop against the side faces of the leg 5.

Figure 9:
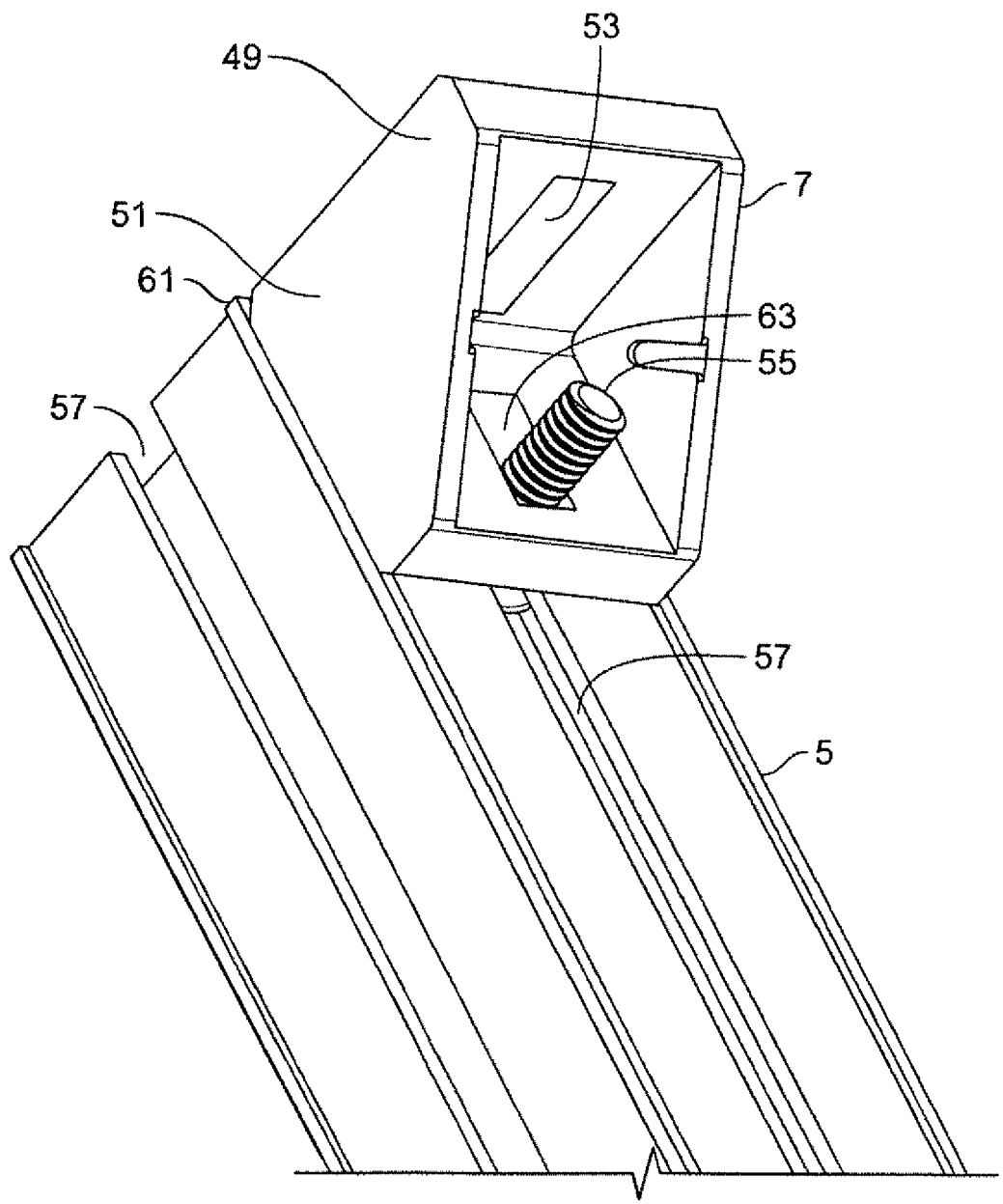
FIG. 9 shows a perspective view of an exemplary connection between a bracket and leg of the platform system of FIG. 1.

An attachment between the leg 5 and bracket 7 is shown in FIG. 9. The bracket 7 fits within the lips 61 of the leg 5 for anti-rotation purposes. The carriage bolt 63 is shown extending through the slot 57 in the leg 5 and the opening 55 in the bracket 7. As with the use of a carriage bolt in connection with the beam 3 and the bracket, the carriage bolt head is first located in the space 59 of the leg 5 with the threaded portion extending through the slot 57. The bracket 7 would be secured against the leg 5 using a nut (not shown) and in a similar manner as described above when the bracket 7 is secured to an underside of the beam 3.

In the platform system of FIG. 1, the portion 51 of the bracket 7 is attached to an end portion of the leg 5 as shown in FIG. 9 and the other portion 49 of the bracket 7 is secured to a beam 3 as shown in FIG. 7. In an alternative use of the bracket 7 with the leg 5, the portion 49 could abut a ground surface and the opening 53 in the portion 49 could be used with a fastener to attached the portion 49 of the bracket 7 to a floor. This alternative can be view illustratively if the drawing in FIG. 9 were turned upside down and the leg 5 that has the bracket 7 attached to is considered to be the bottom portion of the leg at a ground surface. A fastener adapted to attach to a floor would pass through the opening 53 in the bracket portion 49 for securement to the floor.

While not shown in FIG. 7a, the leg 5 with its slots 57 and spaces 59 on all four sides also allows for a connection between beams themselves when one set of beams is running in one direction, e.g., tile section 9, and another set of beams is running perpendicular to the first set of beams, e.g., tile section 11. As noted above, this platform arrangement can be secured by using legs to attach to the ends of the beams 3 in tile section 11 and securing the legs 5 to the floor using the brackets 7. However, the brackets 7 could also be used to connect the beams together and avoid the need for an additional leg 5 for support. This kind of attachment is shown in FIG. 7b, which shows an underside connection between tiles sections 9 and 11. In this mode, an additional bracket 7' is used to connect the leg 5 to the beam 3' so that leg 5 provides support for both beams 3 and 3'. This arrangement could be visualized with reference to FIG. 7a, wherein a beam would run perpendicular to the beam 3, and an additional bracket 7 would be used on the face opposite to the face using the bracket shown in FIG. 7a. This use of two brackets could also be used to connect ends of two aligned beams together as well.

Figure 10:
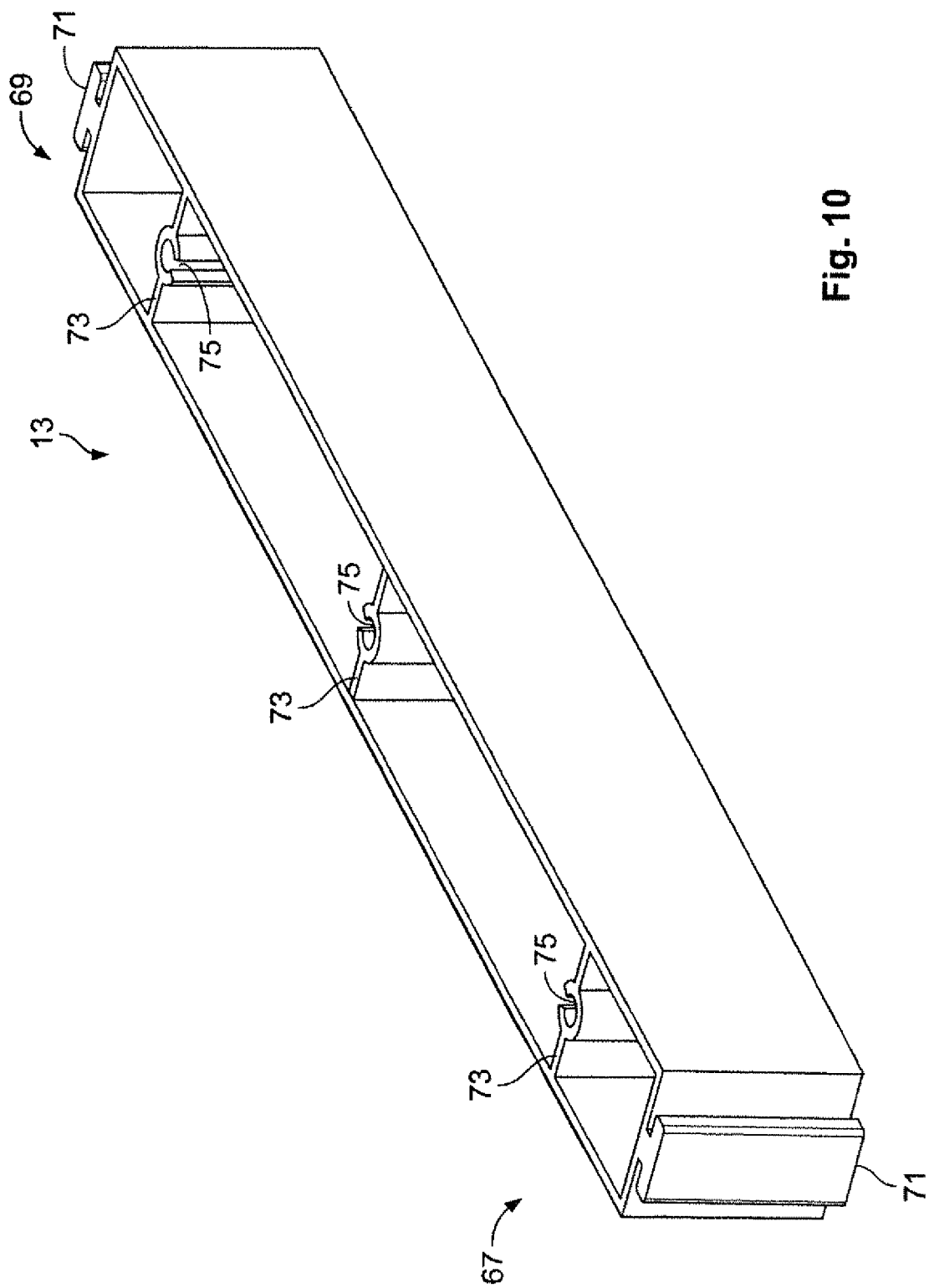
FIG. 10 shows a perspective view of a cross beam of the platform system of FIG. 1.

FIG. 10 shows a perspective view of the cross beam 13 used in the platform system 10 of FIG. 1. The cross beam 13 is made both hollow in transverse cross section and elongate in shape with two opposing ends 67 and 69. Each end has a connector 71. The connector 71 is generally t-shaped, with the wider part of the t-shape sized to engage the space 59 in the leg 5 and the narrow part of the t-shape extending through the slot 57 of the leg 5. The connector 71 would simply be slid into the space 59 of the leg 5 for connection to a desired leg. The cross beam 13 is sized in length so that it would fit between adjacent leg members 5 as shown in FIG. 1.

The cross beam 13 also can include a number of transverse support members 73 that are spaced apart and extend along the longitudinal length of the cross beam 13 for strengthening purposes. Each of the transverse support members can also include a portion 75 that includes an opening 77 extending along the length of the transverse support member 73. The openings 77 provide a guide to receive fasteners to attach the cross beam 13 to a floor surface. If the cross beams 13 are used in connection with the bottom portion of the leg 5 in this way, there is no need to use brackets to secure the legs 5 to a floor, the cross beams 13 can perform this function. Since the cross beams 13 extend between adjacent legs and link them together, they can provide improved stability for the platform system as compared to the use of just brackets 7 at the bottom of the legs as the brackets only provide individual support for a single leg member. Of course, if additional support is needed, a bracket 7 could also be used with the cross beams for leg stabilization, wherein the bracket would be attached to both another face of the leg 5 and a ground surface.

Figure 11:
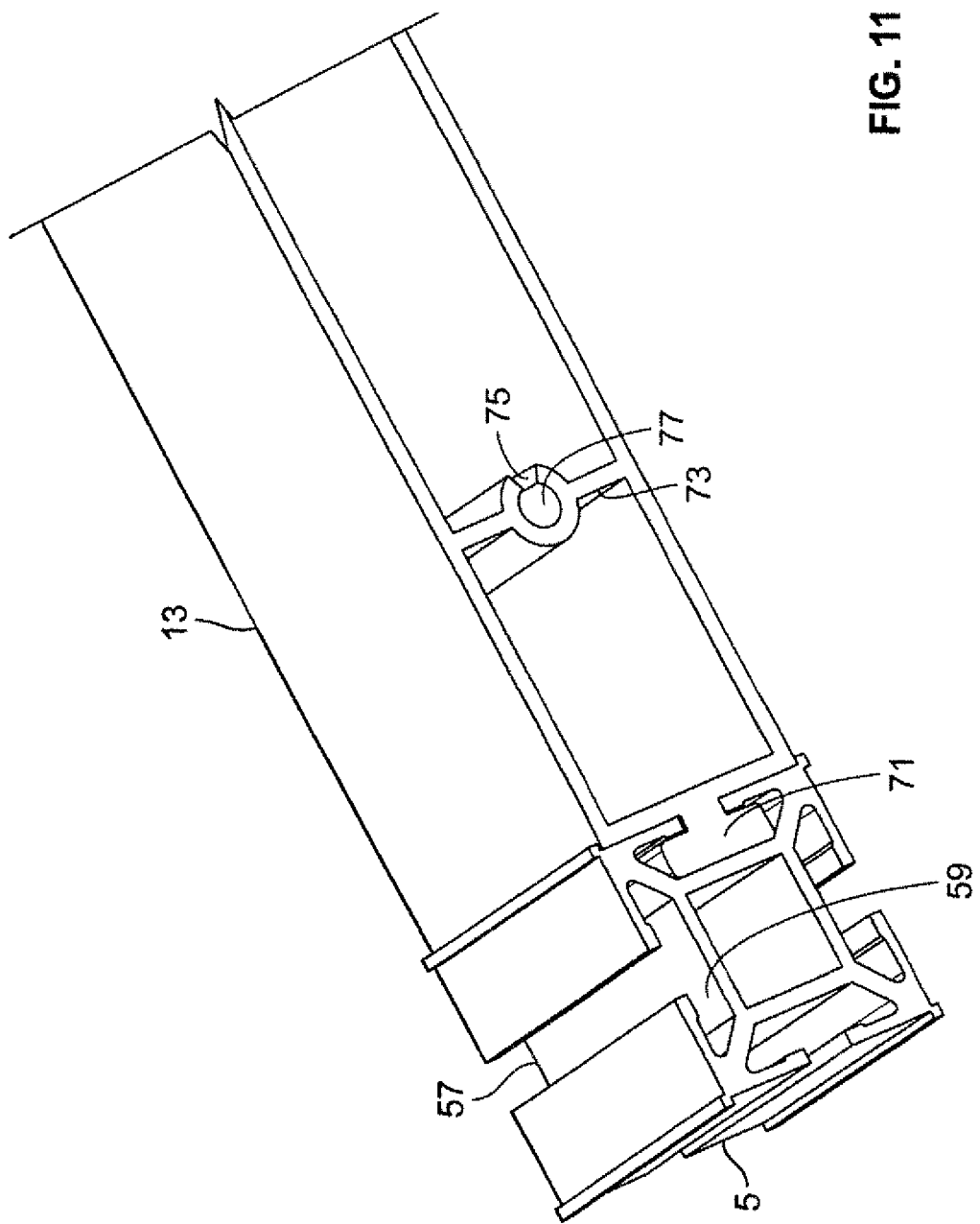
FIG. 11 shows a perspective view of an exemplary connection between a cross beam and leg for the platform system of FIG. 1.

FIG. 11 shows an actual engagement between one of the cross beams 13 and legs 5' used in FIG. 1 to make the step 19, wherein the connector 71 engages the slot 57 and space 59 of the leg 5'.

Figure 12:
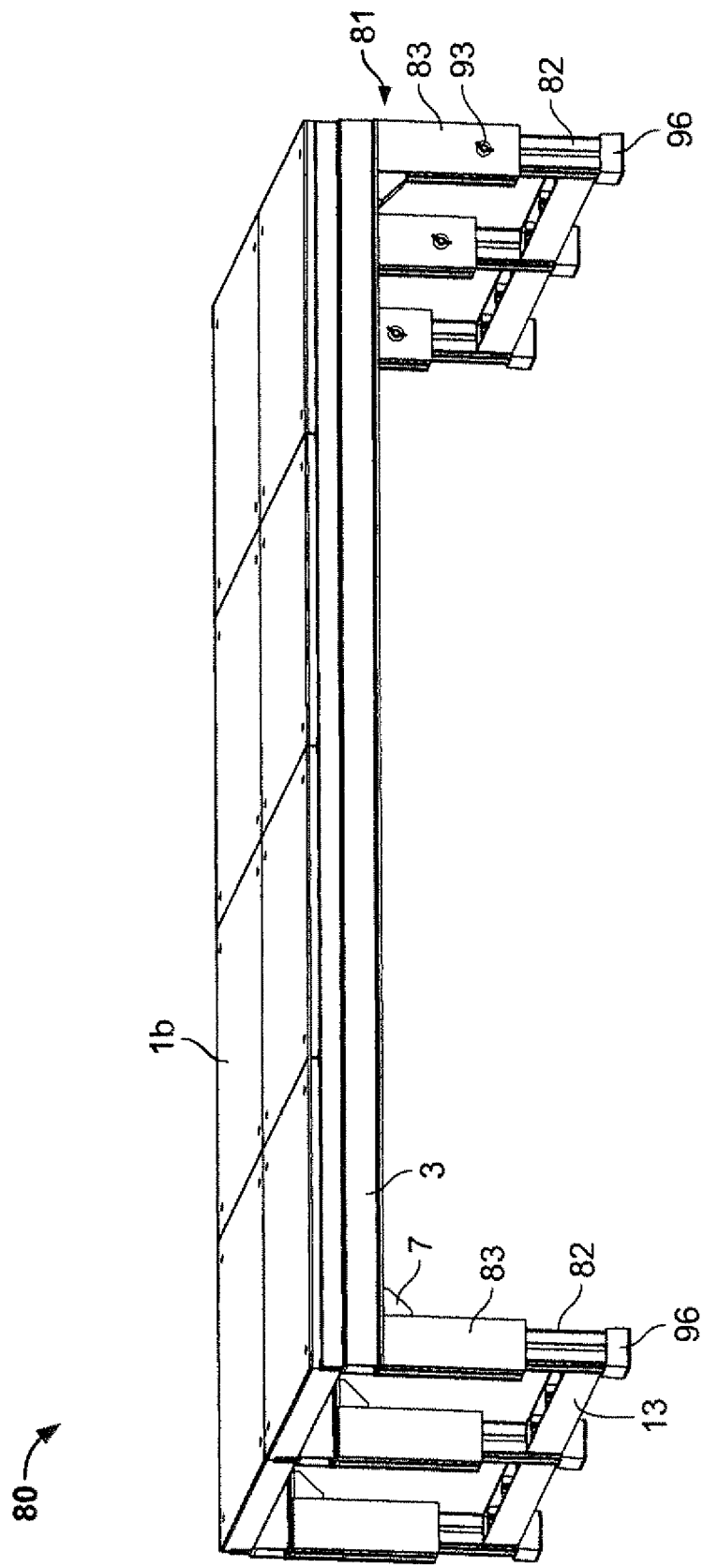
FIG. 12 shows another platform system having an adjustable leg assembly.

While the legs are described as being adjustable by cutting them to a desired length for a given platform elevation, a leg assembly can also be employed that provides adjustability on the fly when assembling a platform. Referring now to FIG. 12, an example of a simple one elevation platform assembly is shown and designated by the reference number 80. The platform assembly 80 is shown with solid tiles 1b. The adjustable leg assembly includes a rectangular-shaped leg section 82 and another and rectangular shaped mating leg section 83.

Figure 13:
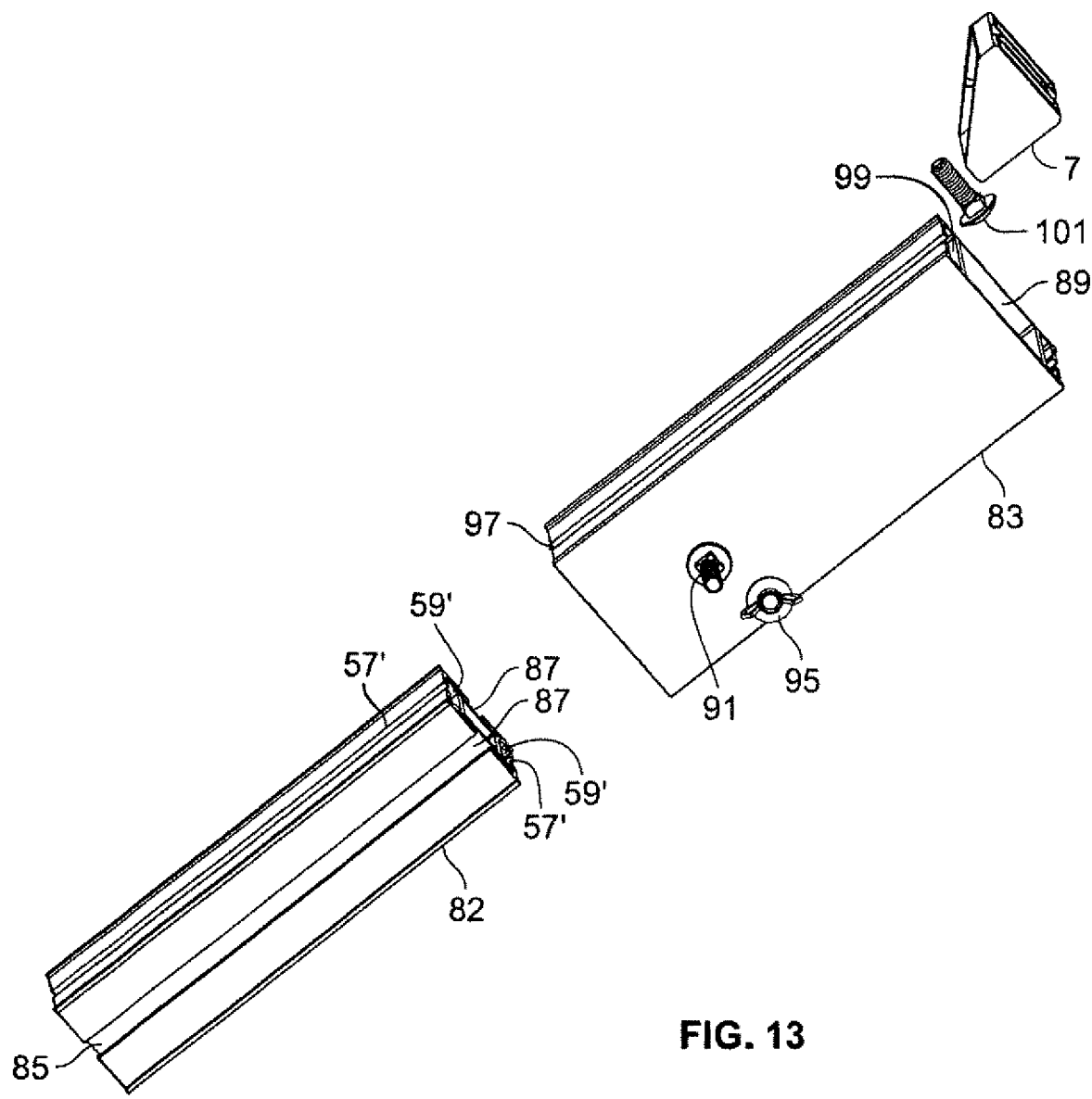
FIG. 13 shows an exploded view of the adjustable leg assembly of FIG. 12.

FIG. 13 shows an exploded view of the assembly of the two leg sections 82 and 83 along with a bracket 7, which interfaces with the leg section 83 for attachment to a beam 3. The leg section 82 differs from leg 5 in that there are only two slots and spaces 57' and 59' for use with the bracket 7. The other two sides of the leg section 82 have a second pair of slots 85 and spaces 87 that are designed not to interface with a bracket 7 or cross beam 13 but interface with the mating leg section 83 for height adjustability of the platform system as detailed below.

The leg section 83 has a through opening 89 along its longitudinal axis, the opening 89 sized to receive the leg section 82 so that the leg section 83 can slide along the length of the leg section 82. The adjustable leg assembly 81 also includes a carriage bolt 91. The head of the carriage bolt 91 is designed to fit into the space 87 of the leg section 82. The leg section 83 also has an opening 93 (see FIG. 12). The threaded part of the bolt 91 passes through the opening 93. A wing nut 95 is provided that threadably attached to the bolt 91.

In operation of the adjustable leg assembly 81, the desired height for the leg assembly is determined and the leg sections 82 and 83 are moved with respect to each other until their combined height matches the desired height. As part of this movement, the head and a portion of the threaded part of the carriage bolt 91 engages the space 87 and slot 85 of the leg section 82. When the desired height is obtained, the wing nut 89 is tightened to pull the head of carriage bolt 91 in the space 87 of the leg section 82 such that outer surfaces of the leg section 82 cinch against an inner surface of the opening 89 of the leg section 83. With the tightening of the wing nut 95, the leg sections 82 and 83 are not moveable with respect to each other and the overall leg height is set. The overall leg height is easily adjusted by loosening the wing nut 95 and adjusting the relative positions of the leg sections 82 and 83.

Once the overall leg height is established, the leg section 83 can be secured to a beam 3 as part of creation of a given platform system. To accommodate attachment of the leg section 83 to a beam 3, the leg section 83 is provided with a pair of opposing slots 97 and spaces 99. The slots and spaces 97 and 99 are configured similarly to the slots 57' and 59' of the leg section 82, which are also similar to the slots and spaces 57 and 59 in the leg 5. By having the slots and spaces 97 and 99 in the leg section 83, the same bracket 7 can be attached to the leg section 83 using a carriage bolt 101, which is similar to the attachment of the bracket 7 to the leg 5.

FIG. 12 also illustrates another embodiment of invention, wherein rubber feet 96 are attached to the bottom portions of the legs. Because of the way that the cross beams 13 attach to the legs 5 using a carriage bolt, the connector 71 for the cross beam 13 and the slot 57 and space 59 in the leg 5, the cross member 13 can be attached at different locations along the length of the leg 5. This height flexibility in cross beam positioning allows the cross beams 13 to be moved from the bottom of the leg members and allow the rubber feet 96 to be attached thereto. The rubber or other resilient material feet are sized to just slip on the bottom end of the leg members 5.

Figure 14:
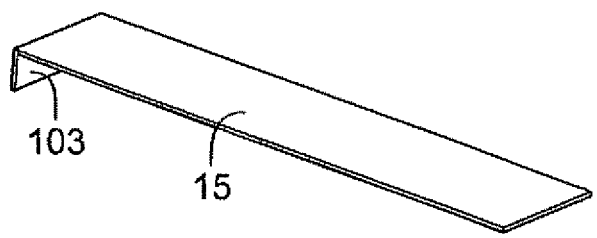
FIG. 14 shows a perspective view of the ramp of the platform system of FIG. 1.

The ramp 15 of FIG. 1 is designed to attach to the beam 3 in a similar fashion as the tiles. Referring to FIG. 14, the ramp 15 has a lip 103. The lip 103 is configured similar to the member 29 of the tile 1 so that a snap fit is achieved when the lip 103 engages the slot 37 of a beam 3. Since this snap-on attachment is similar to that shown for FIG. 5, an illustration of the ramp attachment to the beam is not necessary for understanding of this aspect of the invention.

Figure 15:
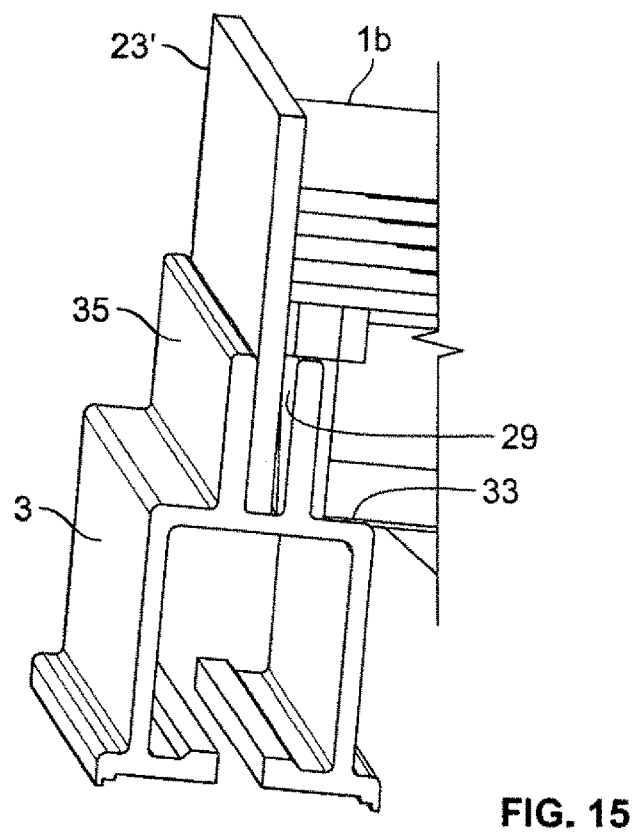
FIG. 15 shows a mounting arrangement for one of the toe boards shown in the platform system of FIG. 1.

A similar kind of attachment with a given beam can be used for the toe board 23' of FIG. 1. Referring to FIG. 15, the toe board 23' is sized to engage the channel 37 in the beam 3 and allow sufficient room for the channel 37 to also receive the member 29 from the tile 1b. Since the toe board 23' would be located as an edge of the platform, the toe board 23 and tile member 29 would always occupy the slot 37. Even without the toe board 23', the snap-on action of the member 29 and the extended member 29 is enough to keep the tile 1b in place.

Figure 16:
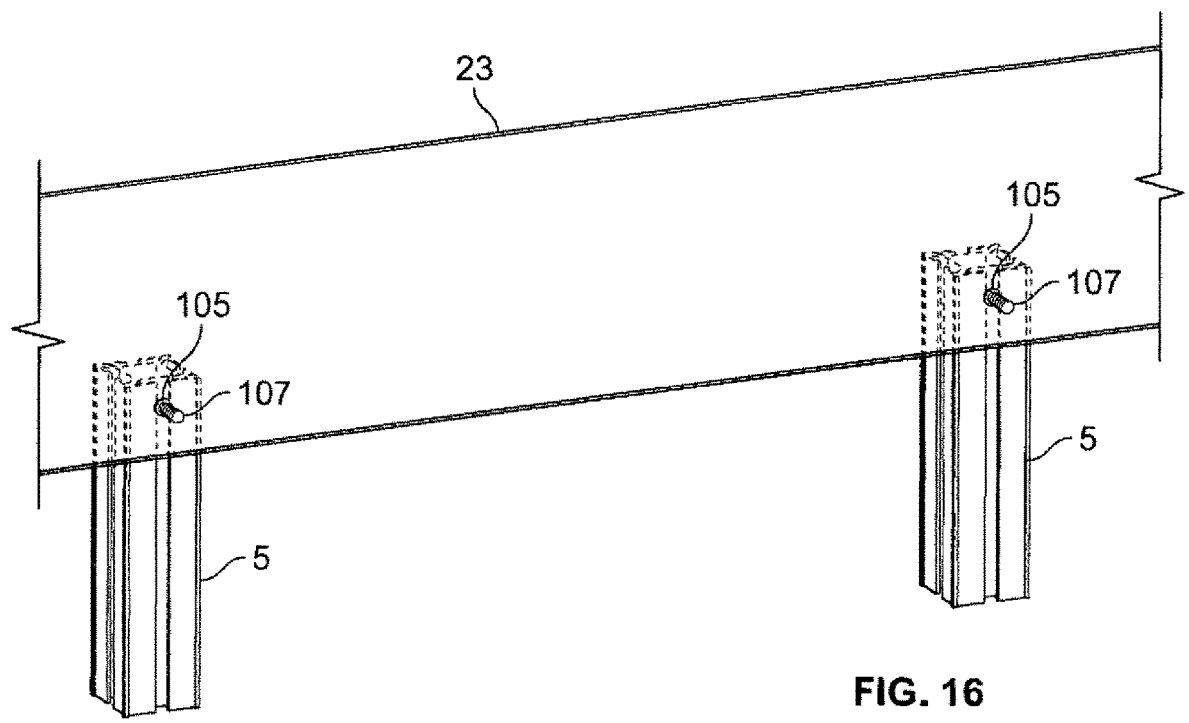
FIG. 16 shows a mounting arrangement for the other toe board shown in the platform system of FIG. 1.

An alternative attachment of the toe board 23 is illustrated in FIG. 16. Here, the toe board 23 has a number of spaced apart openings 105. The openings are positioned so that they coincide with the slots 57 of the spaced apart legs 5. A carriage bolt 107 can be used, with the head located in the space 59 of the leg 5 and a wing nut (not shown) can be used to secure the toe board 23 against the side of the platform assembly. While the toe boards are shown with a particular attachment, other configurations can be used providing that a portion of the toe board extends above a surface of the platform to prevent items from dropping off sides of the platform. While the toe board is shown in FIG. 1 in connection with platform section 9, it can be mounted in any location on the platform system where the problem of items rolling off the platform may exist. That is, if tile section 11 used closed tiles, toe boards could be used on either of the long sides of the tile section 11.

Figure 17:
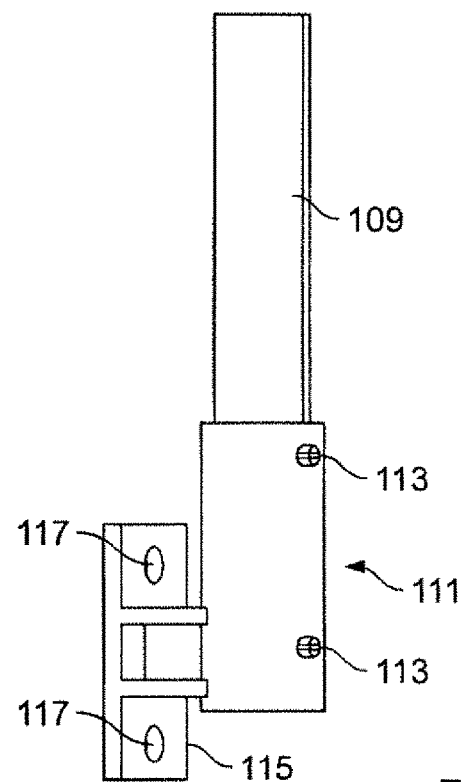
FIG. 17 shows details of a mounting bracket for the handrail shown in the platform system of FIG. 1.

The railing 17 of FIG. 1 can be used with a given platform if so desired. Moreover, the railing 17 can be attached to the platform assembly using any known attachment means. While the railing has one rail running horizontally along the platform, more than one horizontal rail could be used if so desired. One example of an attachment of a railing 17 to the platform system is shown in FIG. 17. Here, an end portion of a railing vertical post 109 of the railing 17 is held in a bracket 111 using set screws 113. The bracket 111 includes an attachment flange 115 that is designed to interface with a leg by using carriage bolts, each carriage bolt head being positioned in a space 59 of a leg 5 and the threaded part of the bolt passes through the slot 57 in the leg and openings 117 in the attachment flange 115. The bracket 111 can then be secured using a wing nut or the like.

Figure 18:
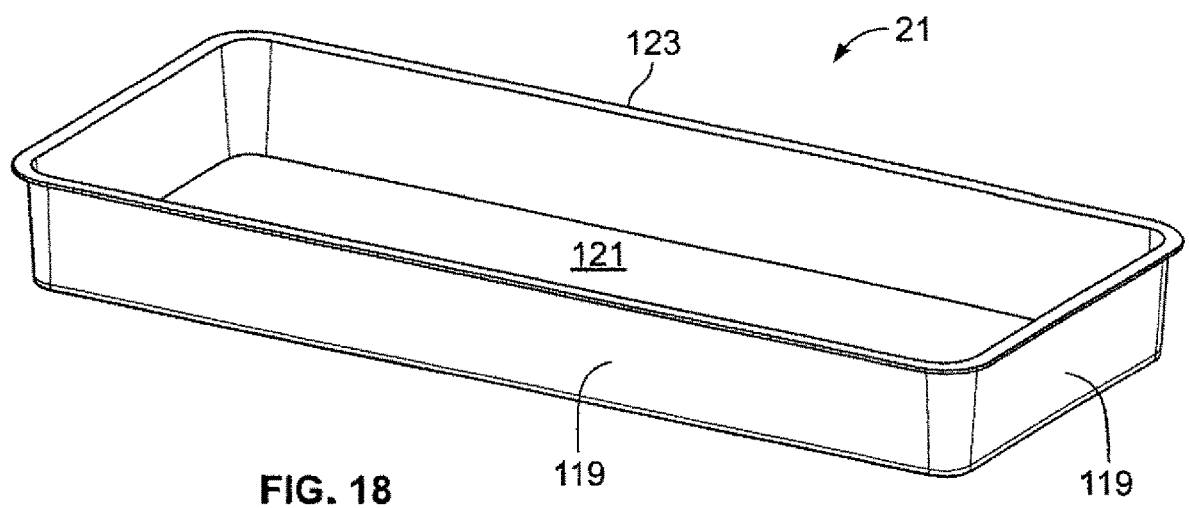
FIG. 18 shows a perspective view of a tray used in the platform system of FIG. 1.

Another aspect of the platform system is the use of the trays 21 in the section 11 of the platform system of FIG. 1. As explained above, the open tiles 1a in section 11 allow items to pass through the tiles and the tiles can catch the items so that the floor beneath the platform system is kept cleaner and needs less maintenance. A perspective view of one of the trays 21 for use with the platform system is shown in FIG. 18. The tray has sides 119, a bottom 121, and a lip 123 that extends along a peripheral top edge of the tray.

Figure 19:
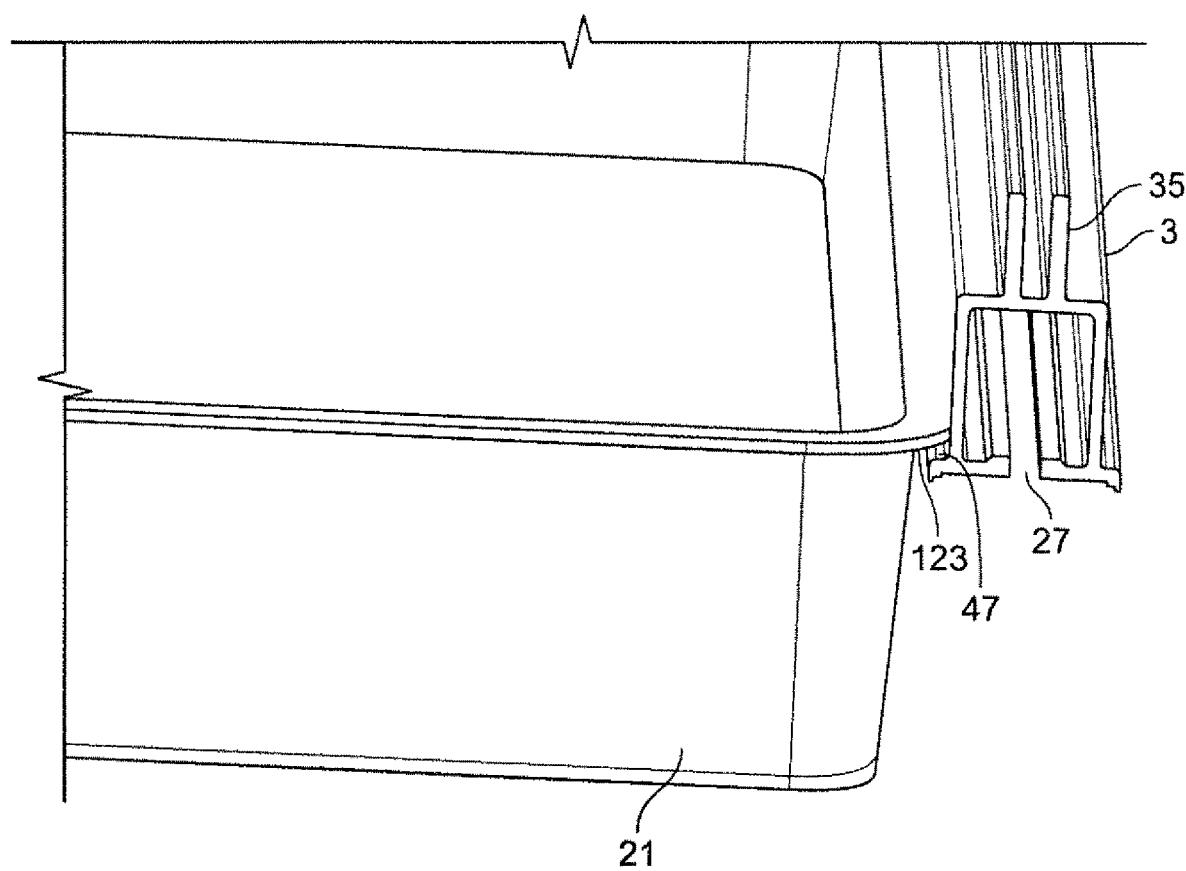
FIG. 19 shows the manner of support of the tray of FIG. 18 when using in the platform system of FIG. 1.

FIG. 19 shows the engagement between a tray 21 and beam 3 when positioned in the platform system of FIG. 1. The tray 21 is sized in width to fit between adjacent beams of a given platform system. Since tile section 11 has three beams 3, two trays are positioned between adjacent beams 4. At least the lips running parallel to the beams 123 are sized so that each lip 123 rests on the surface 47 of beam 3, see FIG. 4 for the defined surface 47. When the tray 21 is positioned between two adjacent beams 3, each of the opposing lips 123 slides on the surface 47 when inserted into the opening 125, see FIG. 1, created by the leg members 5, the tiles 1a, and the cross beam 13. In the platform system of FIG. 1, the trays 21 are sized in length of 3 feet so that two trays would be used to collect debris or other matter that falls through the open tiles 1a.

Figure 20:
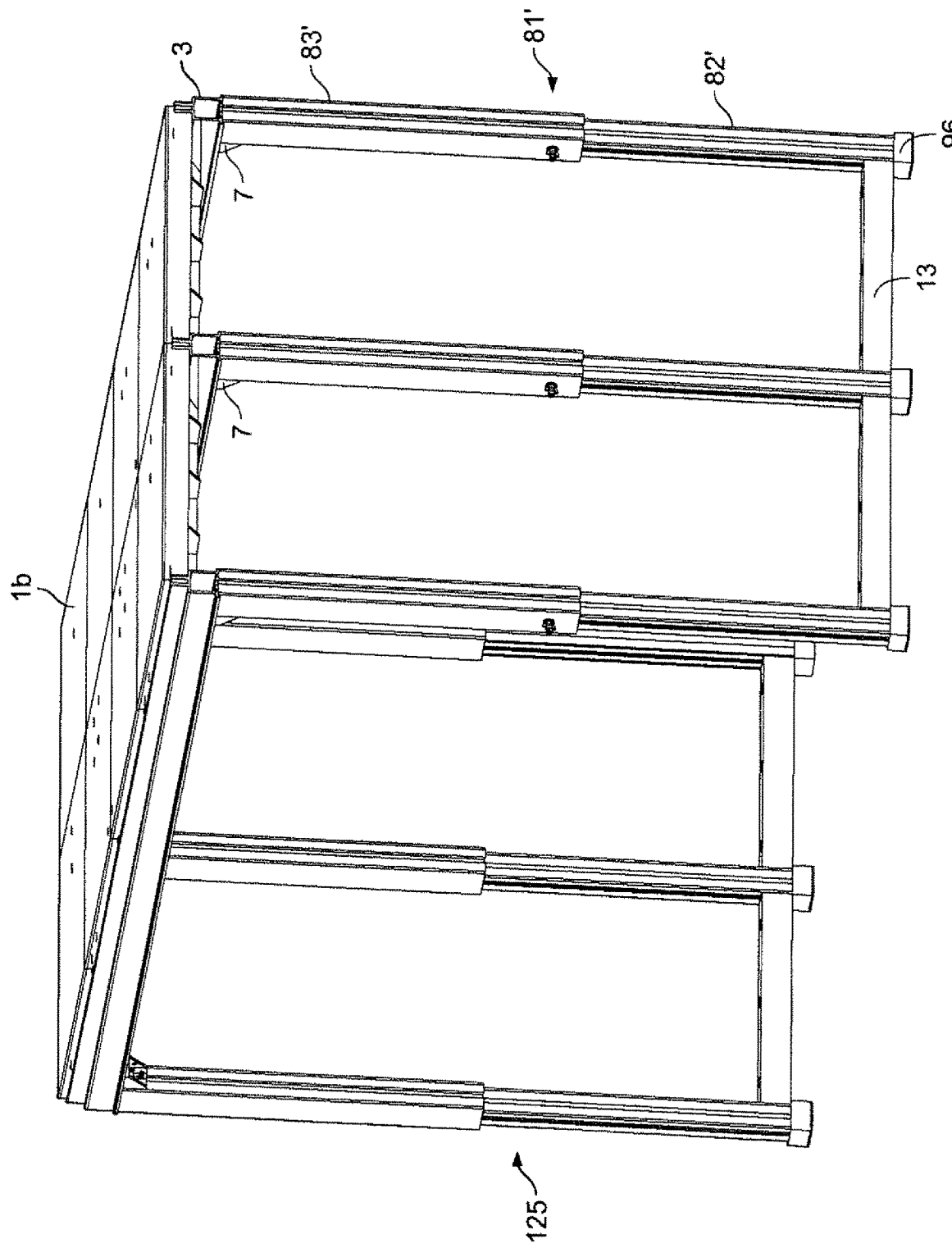
FIG. 20 shows another embodiment of the modular platform system as a table.

FIG. 20 shows a variation of the modular platform of FIG. 12 as a table designated by the reference numeral 125, The table 125 still employs the tiles 1b, beams 3, brackets 7, cross braces 13, and rubber feet 96 that are found in the platform 80 of FIG. 12. The difference is the use of leg assemblies 81'. The leg assemblies 81' are of similar construction as the leg assemblies 81 of FIG. 12. The difference is that both the leg sections 82' and 83' are longer in length as compared to the leg sections 82 and 83 of FIG. 12. Using longer leg sections enables the tile 1b to be at a table height so that the tiles 1b can be used as a table instead of a platform to stand on as in FIG. 12.

Figure 21:
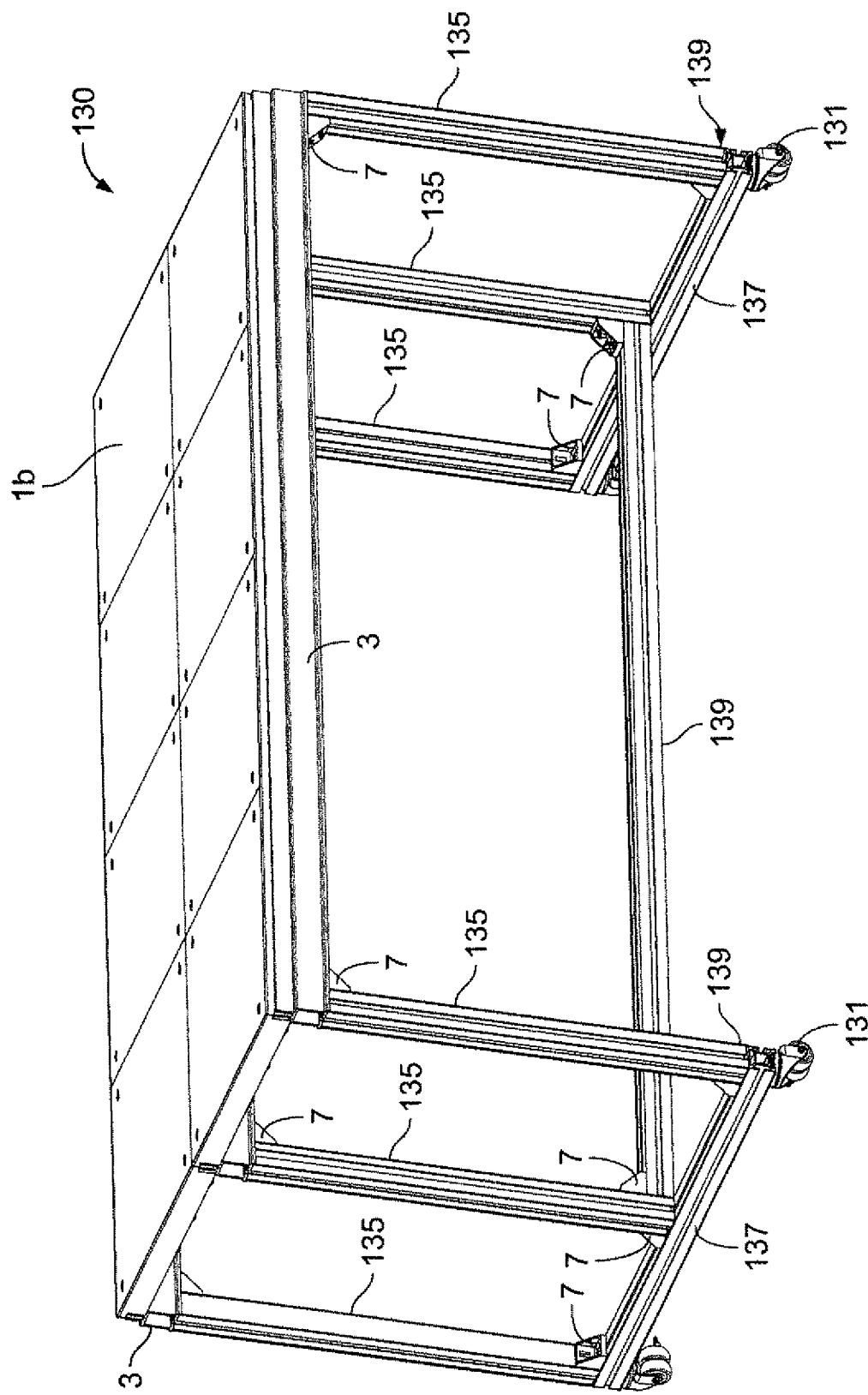
FIG. 21 shows yet another embodiment of the table of FIG. 20.
Figure 22:
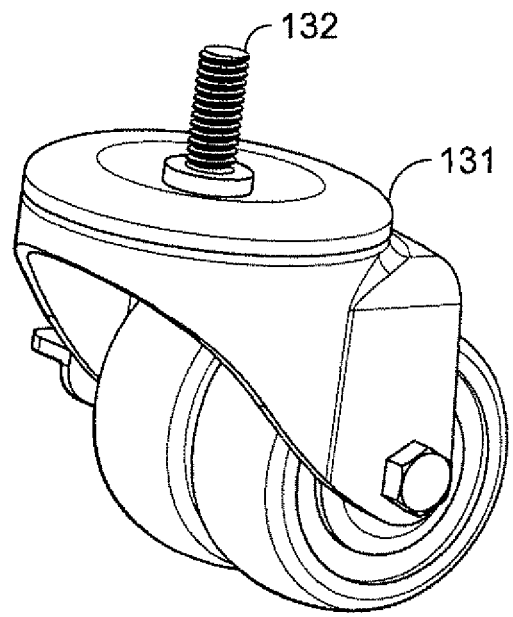
FIG. 22 shows a perspective view of a caster of the table of FIG. 20.
Figure 23:
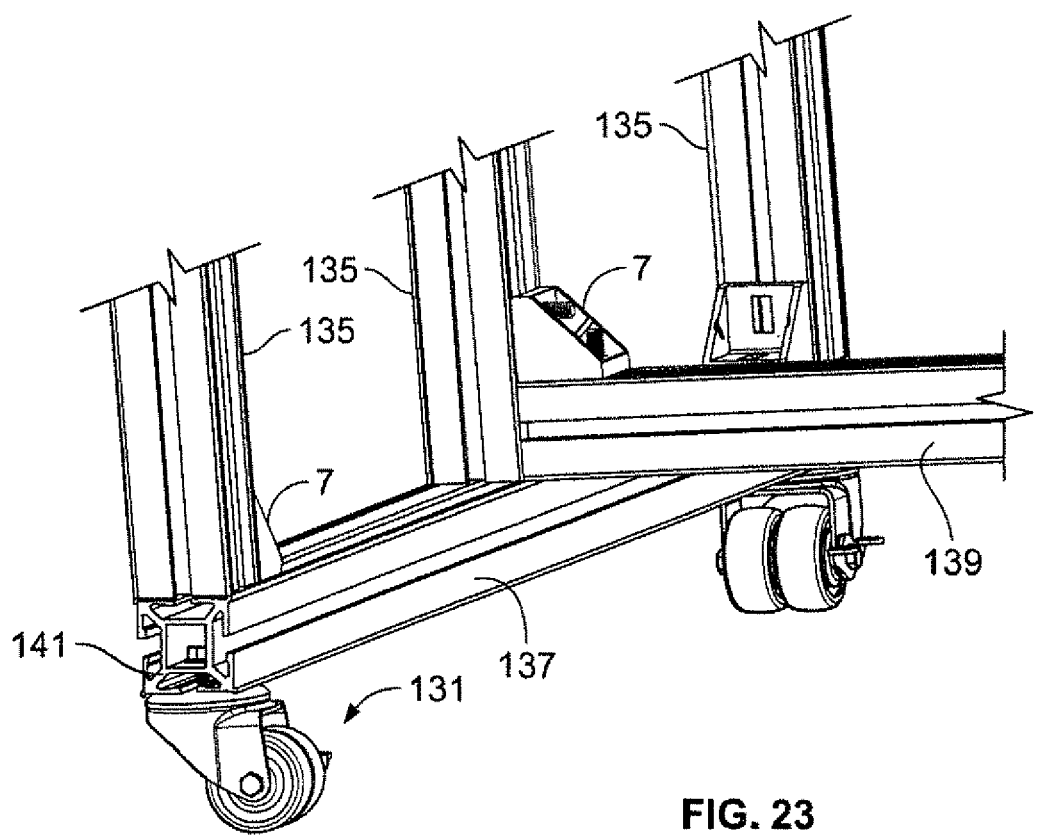
FIG. 23 shows a perspective view of a portion of the table of FIG. 20 enlarged to show more detail of the leg and caster connections.

A variation of the table of FIG. 20 is shown in FIGS. 21-23 and the table is designated by the reference numeral 130. In this system, instead of having fixed feet as shown in FIG. 20, casters 131 are provided to make the table movable. In assembling the movable table from the component parts of the platform system, the vertical legs 135, which are configured the same as legs 5, would be attached to the beams 3 using the brackets 7 as described above. For the base portion of the movable table 130, another set of legs 137, also configured like legs 5, are used to interconnect the free ends 139 of the vertical legs 135, using brackets 7 and their associated carriage bolts and nuts. A horizontally disposed leg 139 is provided to span the long dimension of the table and provide support and interconnect between each of the middle vertical legs 135. As with the other leg to leg connections, brackets 7 are employed.

While the table 130 is shown with casters and horizontally arranged legs to accommodate caster attachment, the table could be used with just the horizontally arranged legs and without casters. In this embodiment, brackets 7 or other means could be used to secure the legs to a floor surface.

FIG. 22 shows one of the casters 131 with a stud 132 and FIG. 23 shows a perspective view of a part of the movable table 130 to better show the connection between the leg 137, the caster 131, the vertical legs 135, the brackets 7, and the horizontal leg 139. The stud 132 of the caster is sized to pass through the slot and space in the side of the leg, see for example, the slot 57 and space 59 of FIG. 8. A hole can be drilled in the leg interior space wall 141 and the caster 131 can be secure in place using the appropriate nut for the stud 132. In order to be able to use the bracket and leg connections for the legs 137 and 139, the legs need to have the slot and space configuration as shown in FIG. 8 in order for the various connections using the brackets 7 to be made.

For the table embodiments, the legs sections 82' and 83' could be sized so that the table height could range from a typical table height of 30 inches, to counter height (36 inches) or bar height (42 inches). Similarly, for the fixed height movable table of FIGS. 21-23, the vertical legs could be sized to have different desired table height by cutting longer legs, e.g., 6 foot sections, to shorter lengths.

Figure 24:
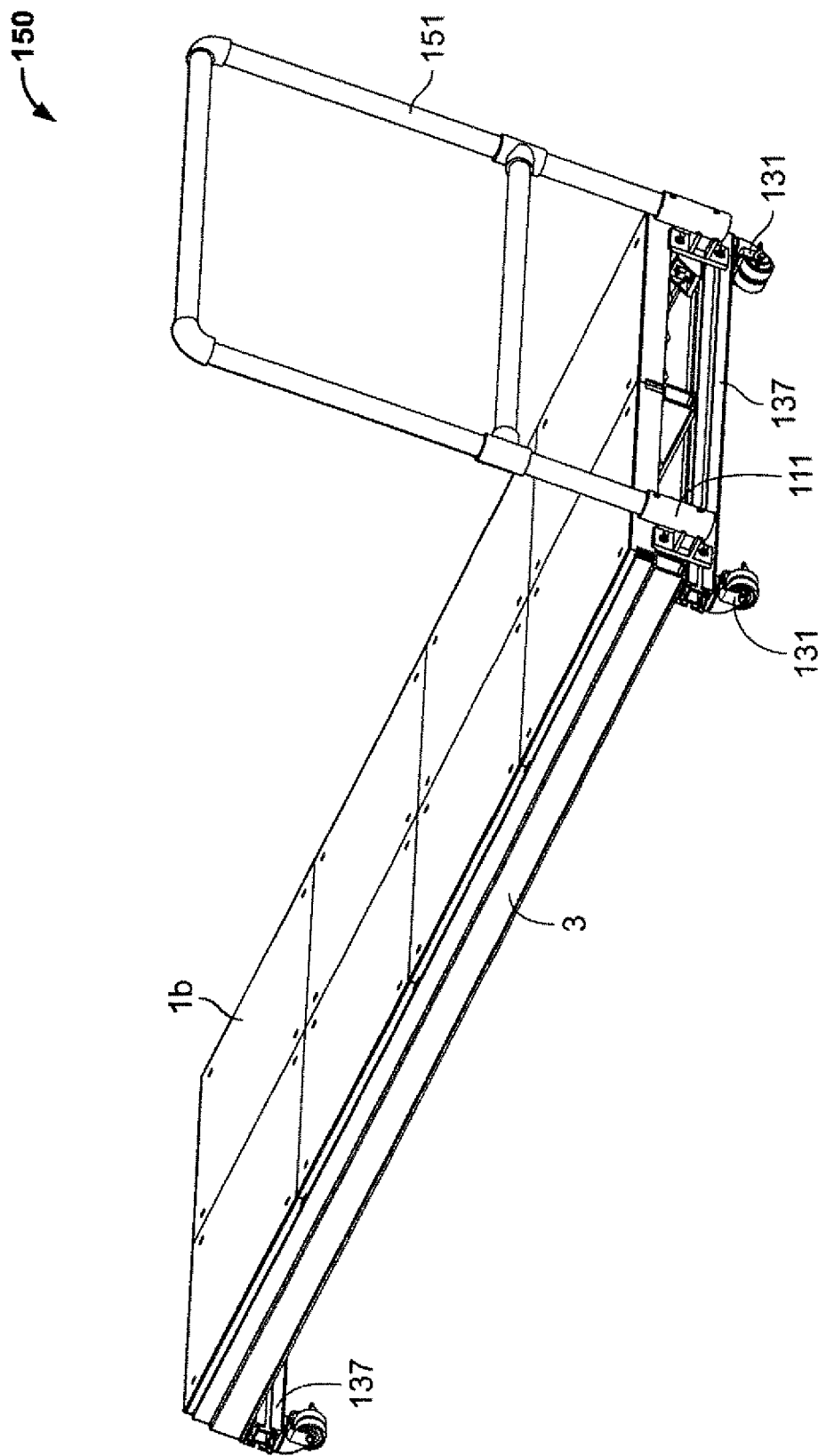
FIG. 24 shows another embodiment of the modular platform system as a cart.
Figure 25:
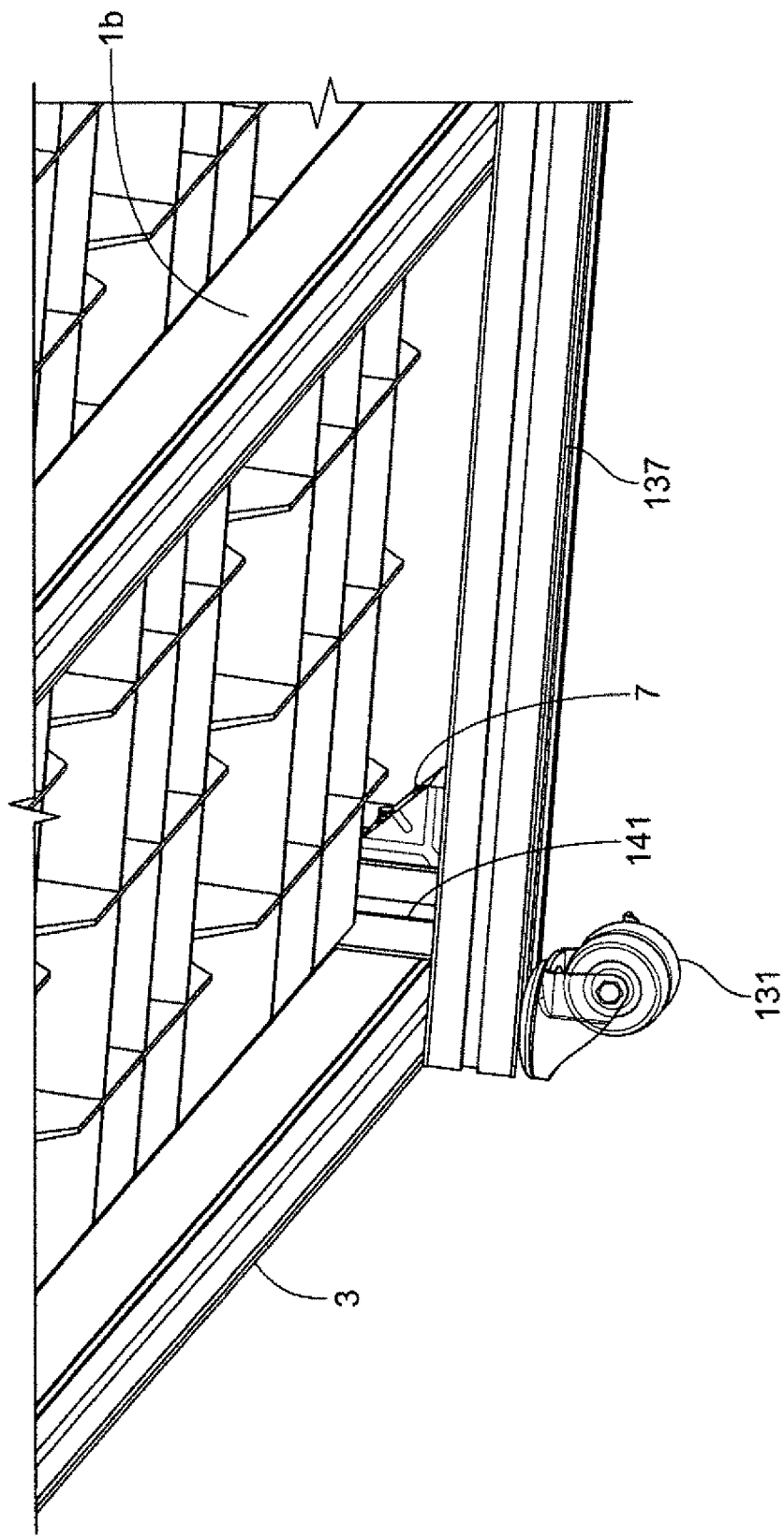
FIG. 25 shows a perspective view of a portion of an underside of the cart of FIG. 24.
Figure 26:
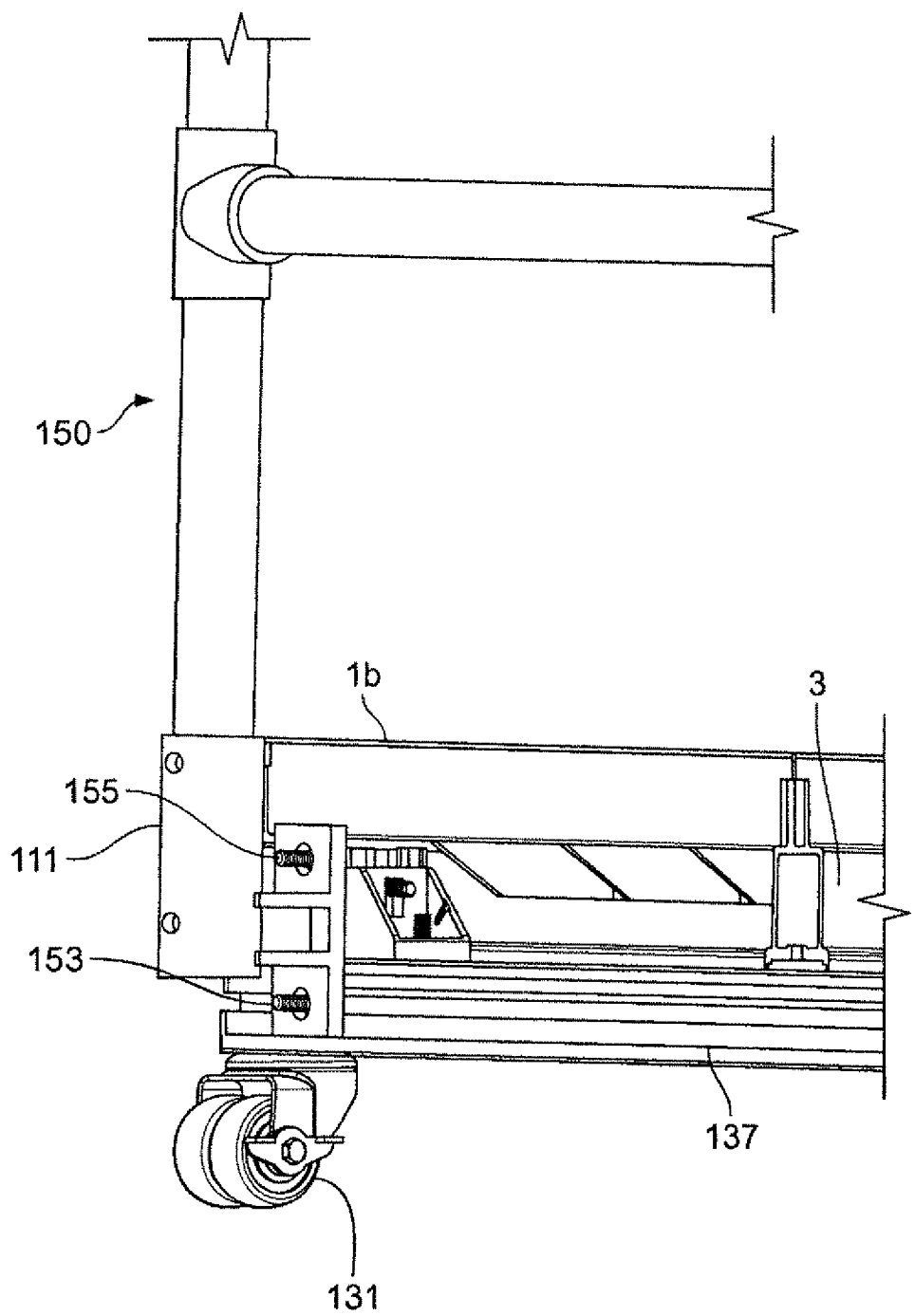
FIG. 26 shows a perspective view of a portion of the cart of FIG. 24 where the push handle is attached.

FIGS. 24-26 illustrate yet another embodiment of the platform system. In this embodiment, a cart 150 is illustrated. The cart 150 includes the tiles 1*b*, the casters 131, beams 3, and legs 137. The casters 131 would be attached to the legs 137 in the same manner as shown in FIGS. 21-23. While not shown, the beams 3 would be attached to the legs 137 using brackets 7. In an alternative, the slot in the beam and slot in the leg could be used with a carriage bolt and nut for attachment together and avoid the use of the bracket.

The cart 150 also includes a push handle 151. The push handle 151 uses the same bracket 111 as shown in FIG. 17. In order to accommodate attachment of the bracket 111 to the cart and with reference to FIG. 25, another short leg 141 is provided, the short leg 141 attached to the leg 137 using a bracket 7. Referring now to FIG. 26, the carriage bolt head (not shown) and the threaded bolt portion 153 uses the slot and space of the leg 137 for attachment of the bracket 111 to the leg 137 in the same manner as the carriage bolt uses the leg slot and space for bracket attachment. The same kind of carriage bolt and threaded bolt attachment are used employing the slot and space in the short leg 141 for the other bolt 155 for the bracket 111. In the cart embodiment of the inventive platform system, the same components of number of tiles, beams, brackets and legs are employed, just that the legs are arranged horizontally rather than vertically so that the surfaces of the tiles 1*b* are very low profile to accommodate cart usage by loading material on the platform surface and moving the cart 150 to a desired location.

While the beams, leg members and cross beams could be made using any materials and in any way, a preferred mode of manufacture is to extrude the beams, leg members, and cross beams using a high strength aluminum. Using aluminum provides a lightweight platform system that has high strength. The extrusion process also facilitates the formation of the various features of the platform system components, for example, the hollow beams, legs, and cross beams, the beam with its upright members and slot, the cross beam connectors and transverse support members, the slot and spaces in the legs 5, and the configuration of slots, spaces and internal openings for the leg assembly 81.

In use, the modularity of the various components of the system allows for immense flexibility in creating a platform system that can be easily customized for any desired platform system, from a simple one elevation design that uses just one kind of tile, a plurality of legs, brackets, and beams, to more complex platform systems that can:

a) use different tiles in one system;

b) have different elevations of tiles for one system, either as two different working sections or a platform system with one or more steps;

c) a platform system that uses railings for safety;

d) a platform system that uses toe boards in connection with closed tiles, e) a platform system that uses a ramp to facility ingress and egress to the platform surface; and f) one or more combinations of the embodiments listed above.

One example of a use would involves determining the surface area of a platform and the number of tiles to be used. Taking the simple platform system of FIG. 12 as an example but with legs 5 instead of the adjustable leg assemblies 81, a platform area of 6 feet by 3 feet is used with one foot high legs. This requires three beams at 6 foot lengths, eight 18×18 inch tiles, 6 one-foot legs, and six brackets, and the necessary carriage bolts to secure the brackets to the undersides of the beams and legs. In one mode of use of the components of the platform system and method of assembly, the tiles 1*b* are attached to the beams 3 so that the spacing of the beams 3 is established. Then, the legs 7 are attached to the beams 3 using the brackets and carriage bolts. The cross beams, if needed or desired to be used, can then be connected between the adjacent legs 5. The platform system can then be supplemented, if so desired, with one or more of the other components described above, e.g., a ramp, a railing, toe boards, trays for open tiles, a step configuration, a different combination of tiles, different elevations for a given platform system, floor or ground surface attachment of the legs using brackets, and the use of adjustable leg assemblies.

Another mode of assembly would be to assembly the beams and legs together first. Then, the cross braces can be positioned on a floor surface and the legs can be attached to the cross braces, see for example, FIG. 11, by merely sliding the legs onto the tee portions of the cross brace connector 71. By creating a pre-assembly of the beams, legs, and cross braces, the spacing is established for an easy snap in of the tiles onto the beams. In another mode of the modular platform system where a low-profile platform system, would be desirable, e.g., four inches or the like, the beams could rest on the floor and the legs would not be needed as part of the assembly. In this mode, the slots 41 in the beams could be used to secure the beams to a ground surface.

This described use of the components and method of assembly of an exemplary platform system is just one example of countless variations on the number of tiles, beams, legs, and brackets to create a custom platform system in a short period of time.

As such, an invention has been disclosed in terms of preferred embodiments thereof which fulfills each and every one of the objects of the present invention as set forth above and provides a new and improved modular platform system and method of assembly.

Of course, various changes, modifications and alterations from the teachings of the present invention may be contemplated by those skilled in the art without departing from the intended spirit and scope thereof. It is intended that the present invention only be limited by the terms of the appended claims.

We claim:

1. A modular platform system comprising:

a plurality of tiles, each tile having a slot positioned along a peripheral edge of the tile and along an underside of the tile, the tile also having an underside surface aligned with the slot, the slot formed by a member extending downwardly from an upper portion of the tile;

a plurality of beams, each beam having a pair of upright members extending from a top surface of the beam, the pair of members spaced apart to create a channel, the channel configured to receive the member of the tile, the top surface of the beam having a portion extending outwardly from each upright member, the portion engaging the underside surface of a tile for support thereof, each beam further comprising a slot extending along a bottom surface of the beam, a plurality of legs, each leg having side surfaces, each side surface including a slot extending longitudinally along the leg, each leg removably attachable to a portion of one of the beams, wherein the ability of the tiles being attachable to the beams and the legs being attachable to the beams at different locations on the beams allows for the creation of a platform system with the plurality of tiles forming a platform surface.

2. The modular platform system of claim 1, wherein the bottom surface of each beam has a pair of spaced apart flanges, the spaced apart flanges engaging a portion of the leg to prevent turning thereof when the leg is in contact with the beam.

3. The modular platform system of claim 1, further comprising one or more railings, a portion of each railing configured to attach to one of the beams or the legs of the platform system.

4. The modular platform system of claim 1, further comprising one or more ramps, each ramp having a lip configured to engage the channel between the upright members of the beam.

5. The modular platform system of claim 1, further comprising a plurality of cross beams, each cross beam having opposing ends, each opposing end configured to attach to a side face of the leg member.

6. The modular platform system of claim 1, wherein each leg further comprises a leg assembly that is adjustable in height to allow tiles of the modular platform system to be at different elevations.

7. The modular platform system of claim 1, further comprising one or more toe boards, the toe boards configured to attach to a leg or a beam, each toe board sized to have a portion thereof extend above the platform surface to act as a stop to prevent items from rolling off the platform surface.

8. The modular platform system of claim 1, wherein at least a number of the plurality of tiles are open tiles, the modular platform system further comprising a plurality of trays, each tray configured to be supported by adjacent beams and be positioned beneath one or more open tiles to catch any material falling through the open tiles.

9. The modular platform system of claim 1, wherein each of the plurality of legs have a defined length, the legs cut to two different lengths so as to create at least a two level system using shorter legs to create a lower level platform.

10. The modular platform system of claim 1, wherein each leg has a lip on a longitudinal edge thereof, opposing lips for each face of the leg forming a channel to receive a portion of a bracket and prevent rotation of the bracket when attached to a leg.

11. The modular platform system of claim 1, wherein each of the legs and beams are made from extruded aluminum.

12. The modular platform system of claim 5, wherein each of the legs, cross beams, and beams are made from extruded aluminum.

13. The modular platform system of claim 1, wherein each member of each tile is configured to create a bias against an upright member of the beam when the member engages the channel in the beam.

14. The modular platform system of claim 1, further comprising a plurality of casters, wherein at least some of the plurality of legs are used horizontally to allow for caster attachment to the horizontal legs, the casters allowing the platform system to be movable.

15. The modular platform system of claim 14, further comprising a push handle assembly comprising a push handle and push handle brackets, wherein the beams are attached to the horizontal legs and the push handle assembly is attached to at least some of the horizontal legs to form a low profile platform system that can be used as a cart.

16. The modular platform system of claim 1, wherein at least some of the legs are sized to allow the platform surface to be used as a table.

17. The modular platform system of claim 1, wherein at least some of the plurality of legs are used horizontally to create a platform system.

18. A method of creating a platform system comprising providing:

a plurality of tiles, each tile having a slot positioned along a peripheral edge of the tile and along an underside of the tile, the tile also having an underside surface aligned with slot, the slot formed by a member extending downwardly from an upper portion of the tile;

a plurality of beams, each beam having a pair of upright members extending from a top surface of the beam, the pair of members spaced apart to create a channel, the channel configured to receive the member of the tile, the top surface of the beam having a portion extending outwardly from each upright member, the portion engaging the underside surface of a tile for support thereof, each beam further comprising a slot extending along a bottom surface of the beam, a plurality of legs, each leg having side surfaces, each side surface including a slot extending longitudinally along the leg, each leg removably attachable to a portion of one of the beams, attaching the plurality of tiles to the plurality of beams, and supporting the beams using the plurality of legs to form a platform system with the plurality of tiles forming a platform surface.

19. The modular platform system of claim 1, wherein each top surface portion of the beam intended to support the underside surface of the tile terminates at a side wall, each side wall extending from each portion of the top surface in a direction opposite from a direction of extension of the pair of upright members.

20. The modular platform system of claim 1, wherein the beam includes a pair of side walls extending from each portion of the top surface in a direction opposite from a direction of extension of the pair of upright members, a bottom portion of the beam extending between an end of each side wall, the slot extending along the bottom surface of the beam and positioned in the bottom portion.

21. The modular platform system of claim 10, wherein each lip is at a longitudinal corner edge of the leg.

22. The modular platform system of claim 1, wherein the system is free standing and not attached to a floor surface when assembled.

23. The method of claim 18, wherein the system is free standing and not attached to a floor surface when assembled.

24. The modular platform system of claim 1, wherein the system further comprises a plurality of brackets, each bracket having a pair of attaching surfaces, the attaching surfaces forming a 90 degree angle, each attaching surface having an opening to allow a fastener to attach the attaching surface using the slot of the beam or the slot in the leg so as to provide the removable attachment of the leg to the portion of the beam.

25. The method of claim 18, wherein the system further comprises a plurality of brackets, each bracket having a pair of attaching surfaces, the attaching surfaces forming a 90 degree angle, each attaching surface having an opening to allow a fastener to attach the attaching surface using the slot of the beam or the slot in the leg so as to provide the removable attachment of the leg to the portion of the beam.

\* \* \* \* \*